United States Patent [19]
Karr

[11] 3,944,460
[45] Mar. 16, 1976

[54] COMBINATION STRAPPING TOOL FOR PLASTIC STRAP

[75] Inventor: George A. Karr, Homewood, Ill.

[73] Assignee: Interlake, Inc., Chicago, Ill.

[22] Filed: Dec. 14, 1972

[21] Appl. No.: 315,156

[52] U.S. Cl............ 156/494; 53/198 B; 100/33 PB; 156/498; 156/499; 156/502
[51] Int. Cl.² ........................................ B65B 13/02
[58] Field of Search .......... 156/157, 159, 160, 184, 156/212, 217, 304, 494, 498, 499, 502, 507, 443, 459, 468, 366; 53/198 B

[56] References Cited
UNITED STATES PATENTS

| | | | |
|---|---|---|---|
| 2,982,069 | 5/1961 | England | 156/502 |
| 3,360,017 | 12/1967 | Vilcins | 100/33 PB |
| 3,368,323 | 2/1968 | Wood | 156/157 |
| 3,397,105 | 8/1968 | Takami | 156/502 |
| 3,438,833 | 4/1969 | Nakano | 156/502 |
| 3,636,861 | 1/1972 | Weller | 100/33 PB |

*Primary Examiner*—Caleb Weston
*Attorney, Agent, or Firm*—Prangley, Dithmar, Vogel, Sandler & Stotland

[57] ABSTRACT

A manually operable combination strapping tool for applying plastic strapping around an object includes a strap-tensioning and gripping mechanism for holding the strap in a tensioned loop around the object with the supply portion of the strap overlapping the leading end thereof, and a heat sealing mechanism which comprises a cam shaft adapted for camming engagement with a movable pressure block and with a rocker arm which is in turn releasably coupled to a movable heater. As the cam shaft is rotated, the rocker arm moves the heater between the overlapping strap portions and the pressure block is moved to press together the heating element and strap portions for melting thereof. Further rotation of the cam shaft disengages it from the pressure block and decouples the rocker arm from the heater to permit retraction of the pressure block and the heater by separate bias means. Further rotation of the cam shaft again effects cammed movement of the pressure block to bond together the melted strap portions and sever the supply portion of the strap. Means limiting the pressure with which the strap and the heater are pressed together and cooling means are also provided.

17 Claims, 22 Drawing Figures

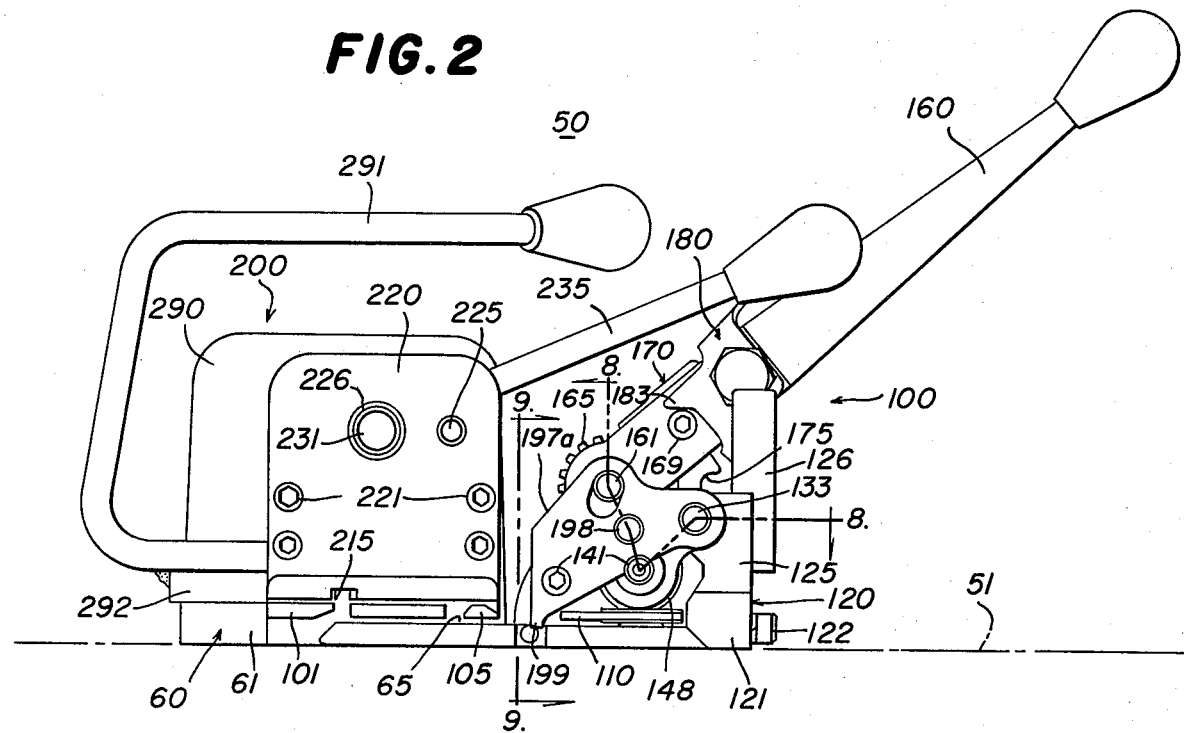
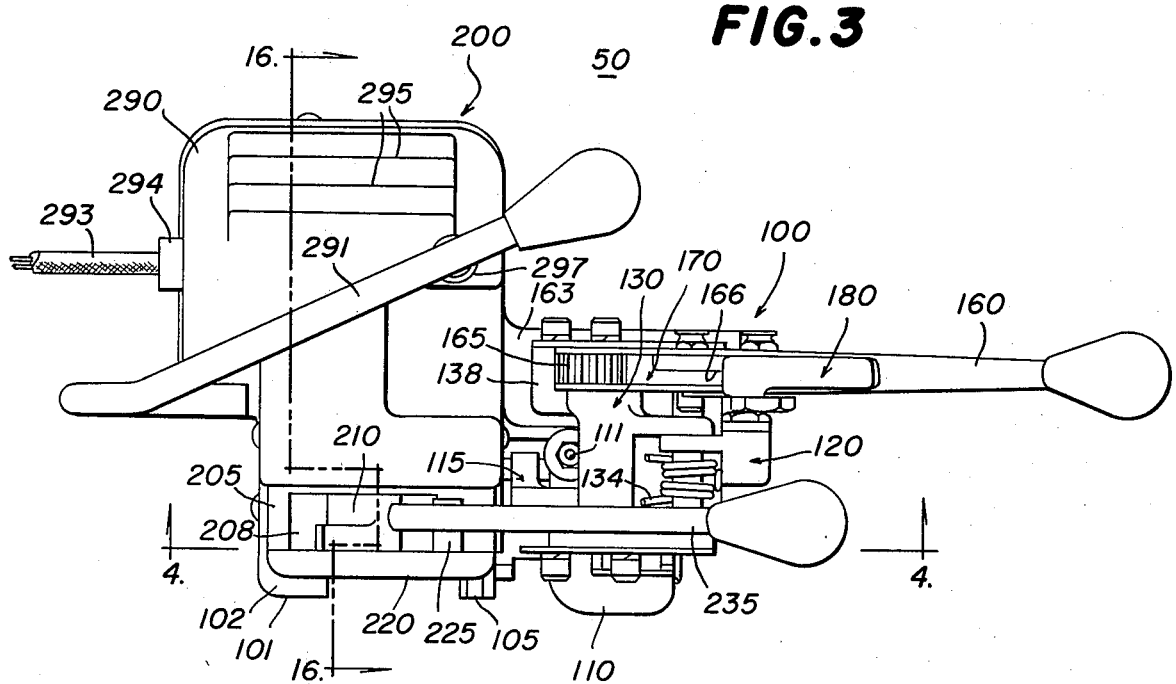

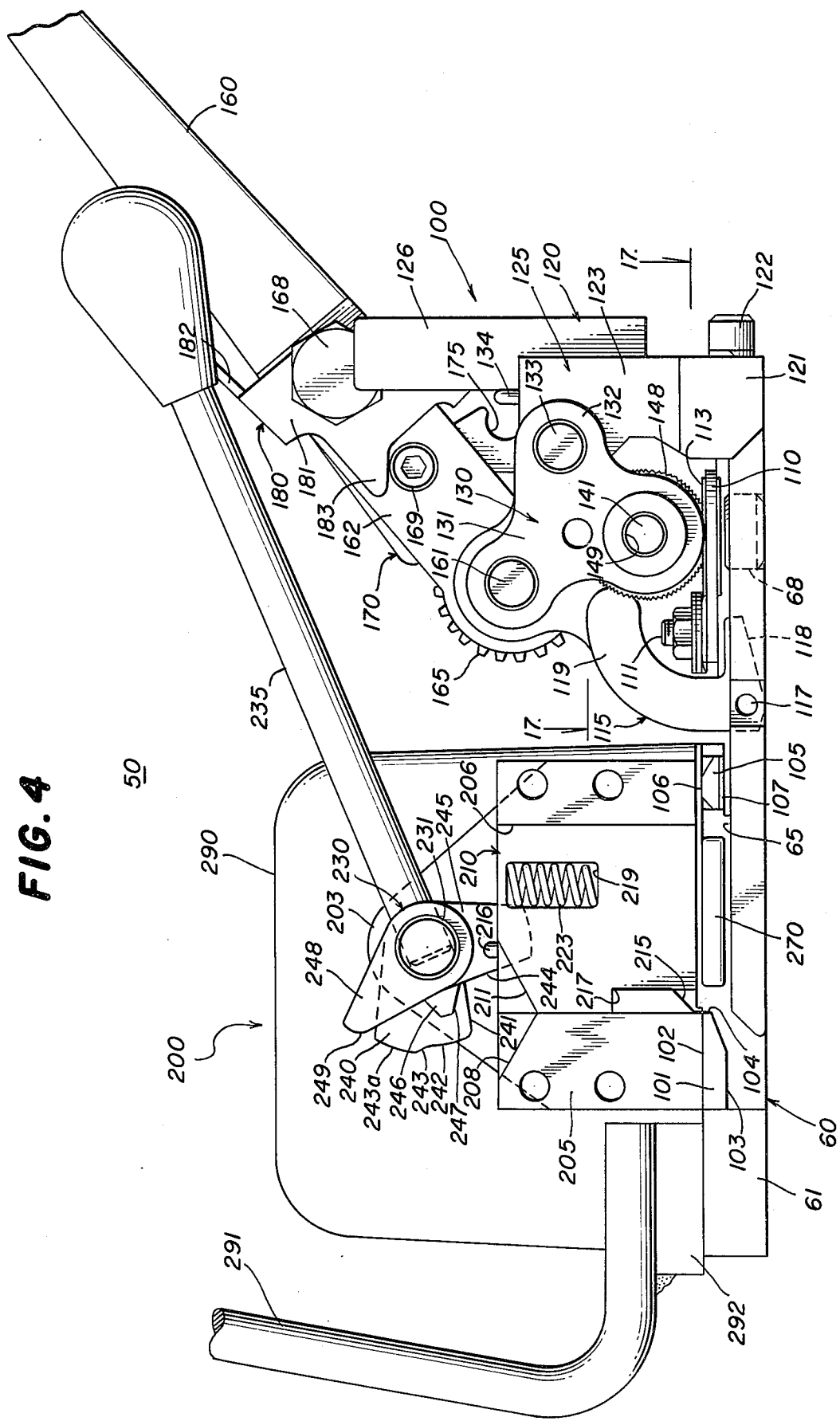

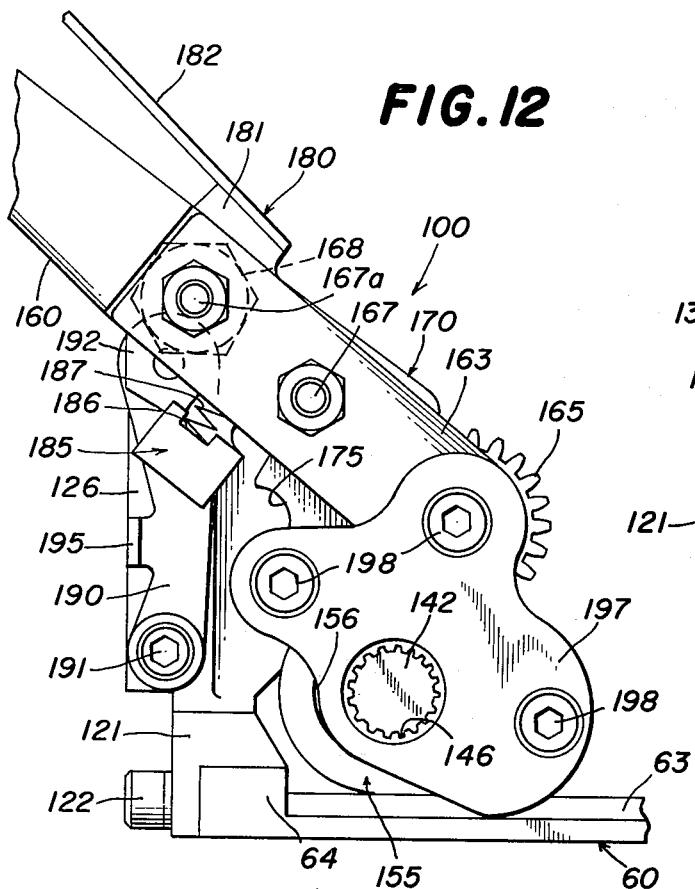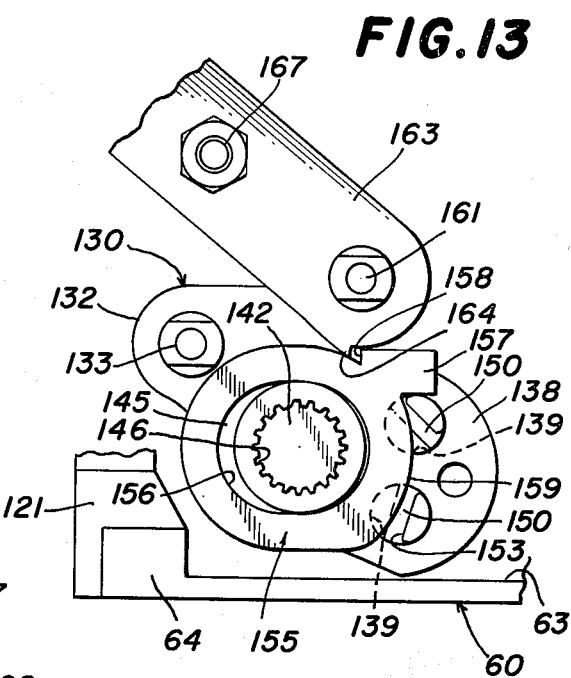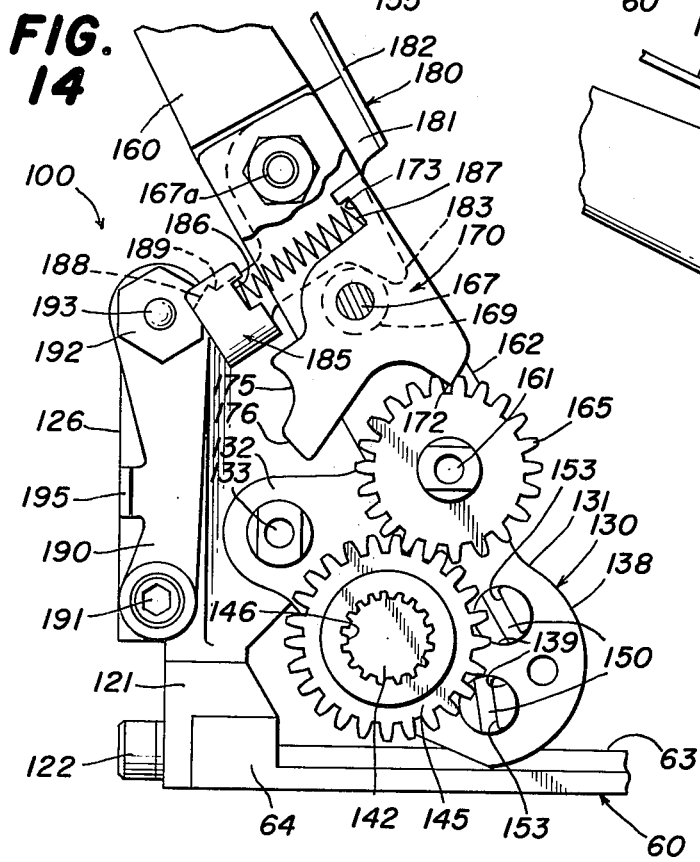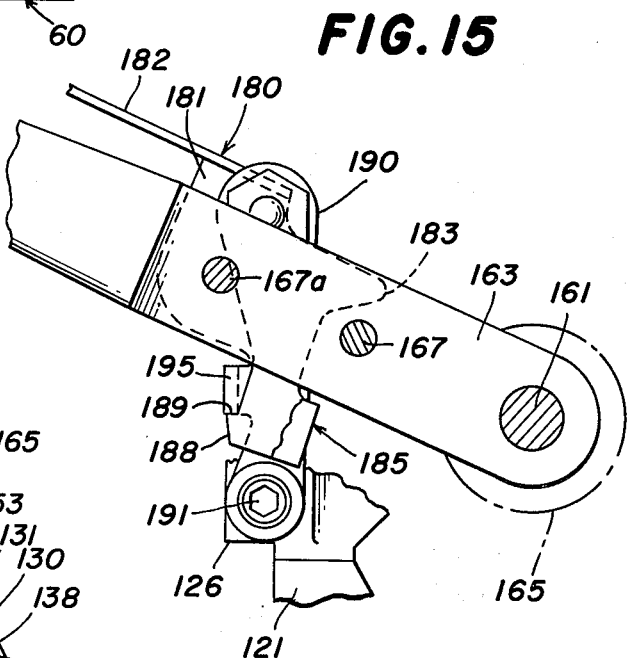

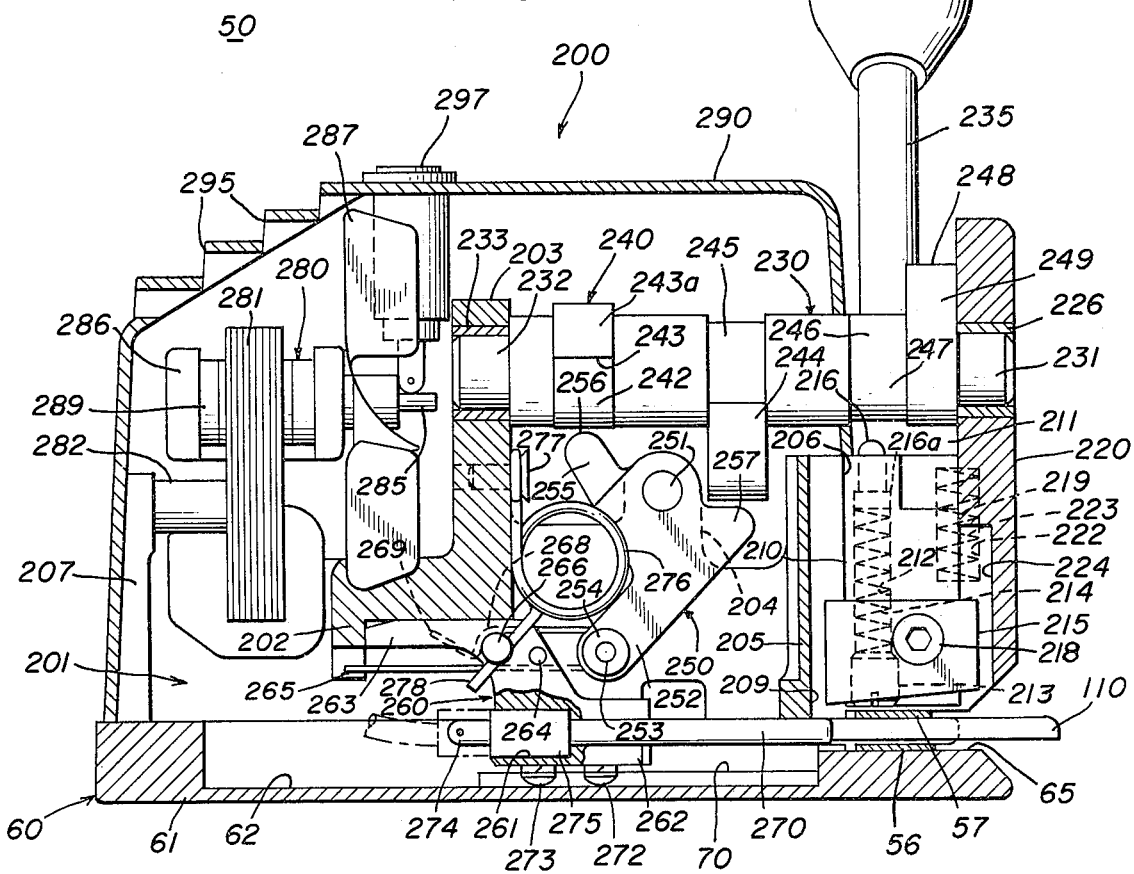
FIG. 16
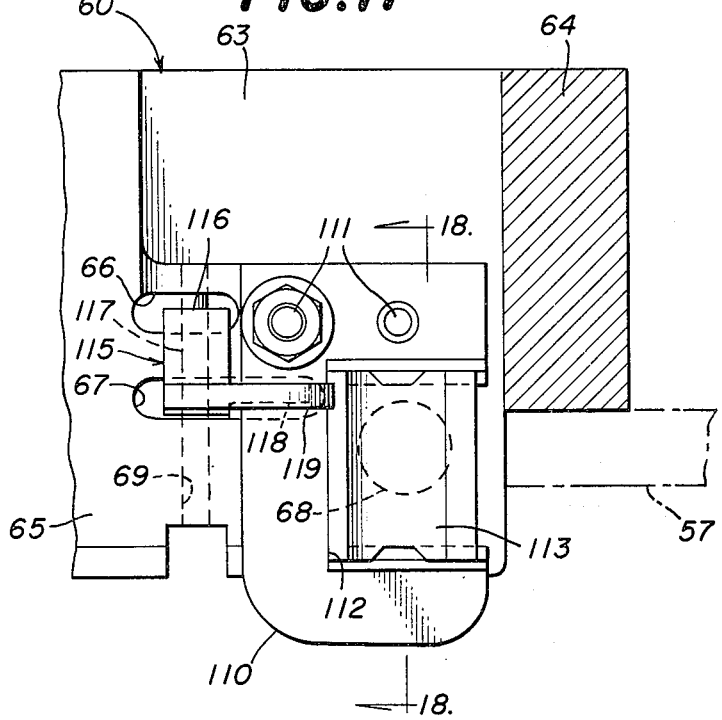
FIG. 17
FIG. 18

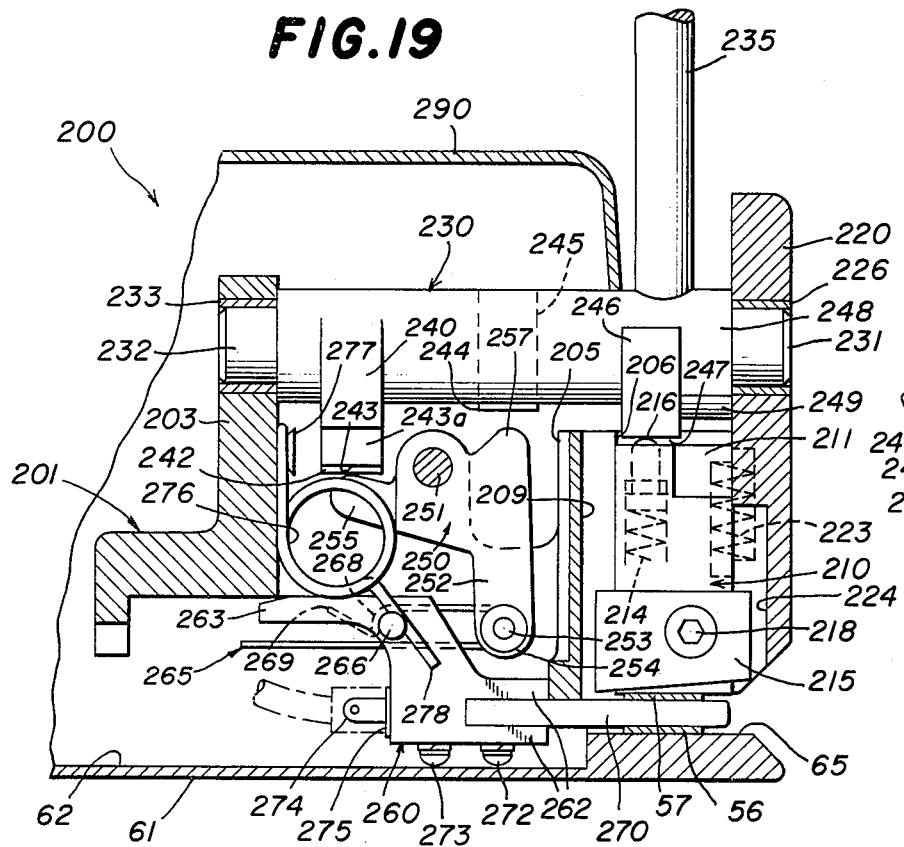
FIG. 19
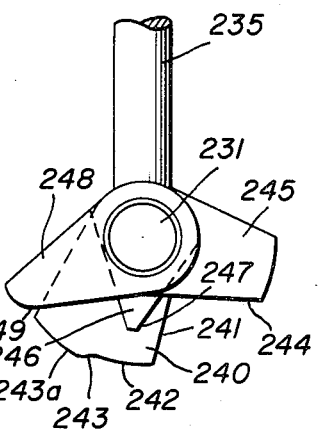
FIG. 19A
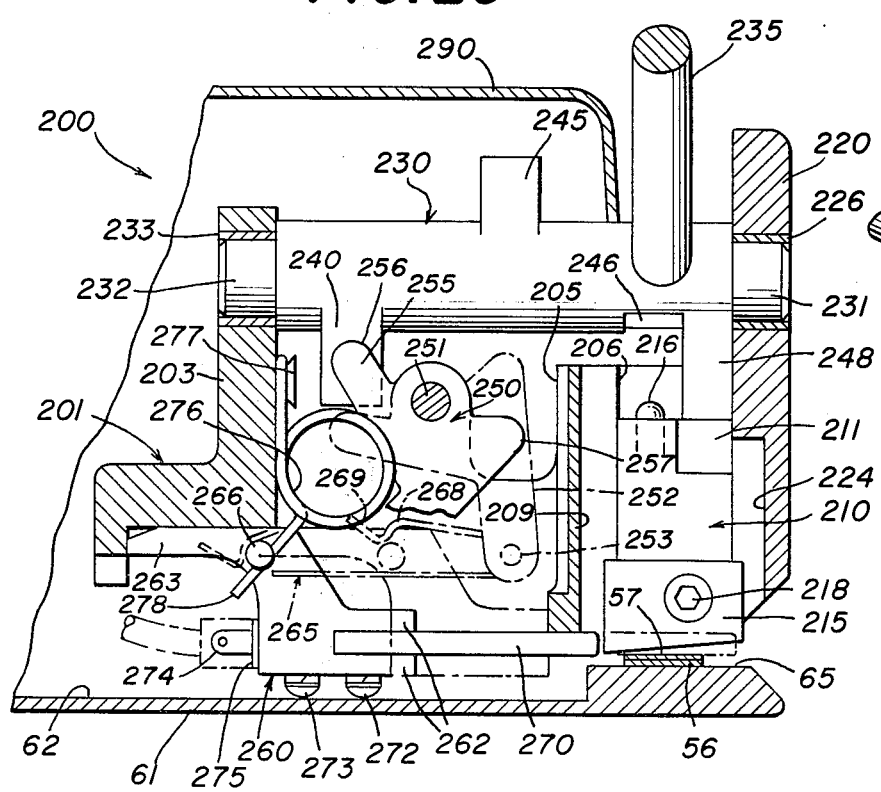
FIG. 20
FIG. 20A

COMBINATION STRAPPING TOOL FOR PLASTIC STRAP

The present invention relates to apparatus for applying strapping around an object. More particularly, the invention relates to apparatus for tensioning plastic strapping in a loop around an object and forming a heat sealed joint in the strap loop for securing it about the object.

It is a general object of the present invention to provide a combination tensioning and heat sealing tool for applying plastic strapping around an object.

Another general object of this invention is to provide a heat sealing tool for plastic strapping which includes a heating element for melting overlapping portions of the strap and a pressure member for pressing together the melted portions of the strap to form a joint therebetween, the tool being characterized by the fact that the heating element is completely removed from contact with the strap prior to pressing together of the melted strap portions to insure the formation of a uniform joint therebetween.

It is an important object of the present invention to provide strapping apparatus for securing a length of plastic strap around an object, the apparatus comprising a frame, strap-gripping means mounted on the frame for holding the strap encircled in a loop in a tensioned condition about the object with the leading end of the strap overlapping and spaced from the supply portion thereof, a heating element movable between a strap-heating position and a retracted position, the heating element in the strap-heating position thereof being disposed between the overlapping portions of the strap for contact therewith to effect melting thereof, the heating element in the retracted position thereof being displaced from between the overlapping portions of the strap and out of contact therewith, actuating means mounted on the frame and coupled to the heating element for effecting movement thereof between the retracted position and the strap-heating position thereof, and pressure means carried by the frame for pressing together the melted overlapping portions of the strap to effect a joint therebetween after the return of the heating element to the retracted position thereof, whereby there is provided uniform heating of the overlapping portions of the strap and the formation of a uniform joint therebetween.

Another object of this invention is to provide strapping apparatus of the type set forth, which further includes bias means resiliently urging the heating element toward the retracted position thereof, the actuating means being releasably coupled to the heating element, and further movement of the actuating means in a predetermined direction after the heating element has been placed in the strap-heating position thereof effecting release of the actuating means from the heating element thereby to permit return of the heating element to its retracted position under the urging of the bias means.

In connection with the foregoing object, it is another object of this invention to provide a strapping apparatus of the type set forth, which further includes latch mechanism movable between a latched condition coupled to the heating element for movement therewith and an unlatched condition decoupled from the heating element, the actuating means being coupled to the latch mechanism, movement of the actuating means from the heating configuration to the sealing configuration thereof moving the latch mechanism to its unlatched condition thereby to permit return of the heating element to its retracted position under the urging of the bias means, movement of the actuating means from the sealing configuration back to the home configuration thereof serving to move the latch mechanism back to the latched condition thereof.

Still another object of this invention is to provide strapping apparatus of the type set forth, wherein the pressure member is movable between a pressing condition in contact with the strap urging together the overlapping portions thereof and a releasing condition out of contact with the strap, the actuating means being coupled to the heating element and to the pressure member, movement of the actuating means from the home configuration to the heating configuration thereof effecting a first movement of the pressure member from the releasing condition to the pressing condition thereof firmly to press together the heating element and the overlapping portions of the strap for melting thereof, and movement of the actuating means from the heating configuration to the sealing configuration thereof sequentially effecting movement of the pressure member back to the releasing condition thereof and movement of the heating element back to the retracted position of a second movement of the pressure member to the pressing condition thereof for pressing together the melted overlapping portions of the strap to form a joint therebetween.

In connection with the foregoing object, it is another object of this invention to provide a strapping apparatus of the type set forth, wherein the frame limits movement of the pressure member in a pressing direction when the pressure member is in the pressing condition thereof, and further including pressure regulating means carried by the pressure member for engagement with the actuating means during movement thereof from the home configuration to the heating configuration thereof for movement thereby with respect to the pressure member when the pressure member is in the pressing condition thereof to absorb force applied to the pressure member in excess of the predetermined force for limiting the pressure with which the heating element and the overlapping portion of the strap are pressed together.

Another object of this invention is to provide a strapping apparatus of the type set forth, which further includes a movable shear blade carried by the pressure member and movable therewith for severing the supply portion of the strap when the joint is formed between the melted overlapping portions of the strap.

Still another object of this invention is to provide strapping apparatus of the type set forth, which further includes cooling and ventilating means mounted on the frame for directing a stream of cooling air to the heating element of the actuating means and the pressure means for cooling thereof and for removal of vapors resulting from melting of the overlapping portions of the strap.

Further features of the invention pertain to the particular arrangement of the parts of the strapping apparatus whereby the above-outlined and additional operating features thereof are attained.

The invention, both as to its organization and method of operation, together with further objects and advantages thereof, will best be understood by reference to the following specification taken in connection with the accompanying drawings, in which:

FIG. 2 is a side elevational view of the strapping apparatus of FIG. 1, as viewed from the left-hand side thereof;

FIG. 3 is a top-plan view of the strapping apparatus shown in FIGS. 1 and 2;

FIG. 4 is an enlarged fragmentary side elevational view of the strapping apparatus of the present invention similar to FIG. 2 with the tensioning handle shown in an unlatched position and with the sealing handle shown in its home position of the apparatus removed more clearly to show the internal construction thereof;

FIG. 12 is a fragmentary side elevational view of the tensioning portion of the strapping apparatus illustrated in FIG. 4, as viewed from the opposite side thereof;

FIG. 13 is a fragmentary side elevational view similar to FIG. 12, with the side plate removed more clearly to show the construction of the holding pawl release mechanism;

FIG. 14 is a side elevational view similar to FIG. 12, with portions of the structure removed or broken away more clearly to show the construction of the drive gear mechanism and the handle latching mechanism;

FIG. 15 is a fragmentary side elevational view generally similar to FIG. 12, showing the tensioning handle in the latched position thereof;

FIG. 16 is an enlarged view in vertical section of the heat-sealing portion of the strapping apparatus taken along the line 16—16 in FIG. 3;

FIG. 17 is a fragmentary top-plan view in partial section of the strap-separating plate mechanism of the present invention, taken along the line 17—17 in FIG. 4;

FIG. 18 is a fragmentary view in vertical section of the separating plate mechamism, taken along the line 18—18 in FIG. 17;

FIG. 19 is a fragmentary view in vertical section similar to FIG. 16, illustrating the sealing apparatus in the strap-heating configuration thereof;

FIG. 19A is a fragmentary side elevational view of the cam shaft of the sealing mechanism in the configuration illustrated in FIG. 19;

FIG. 20 is a view similar to FIG. 19, showing the heat-sealing apparatus disposed in the sealing configuration thereof; and FIG. 20A is a side elevational view similar to FIG. 19A of the cam shaft in the configuration illustrated in FIG. 20.

Figure 1:
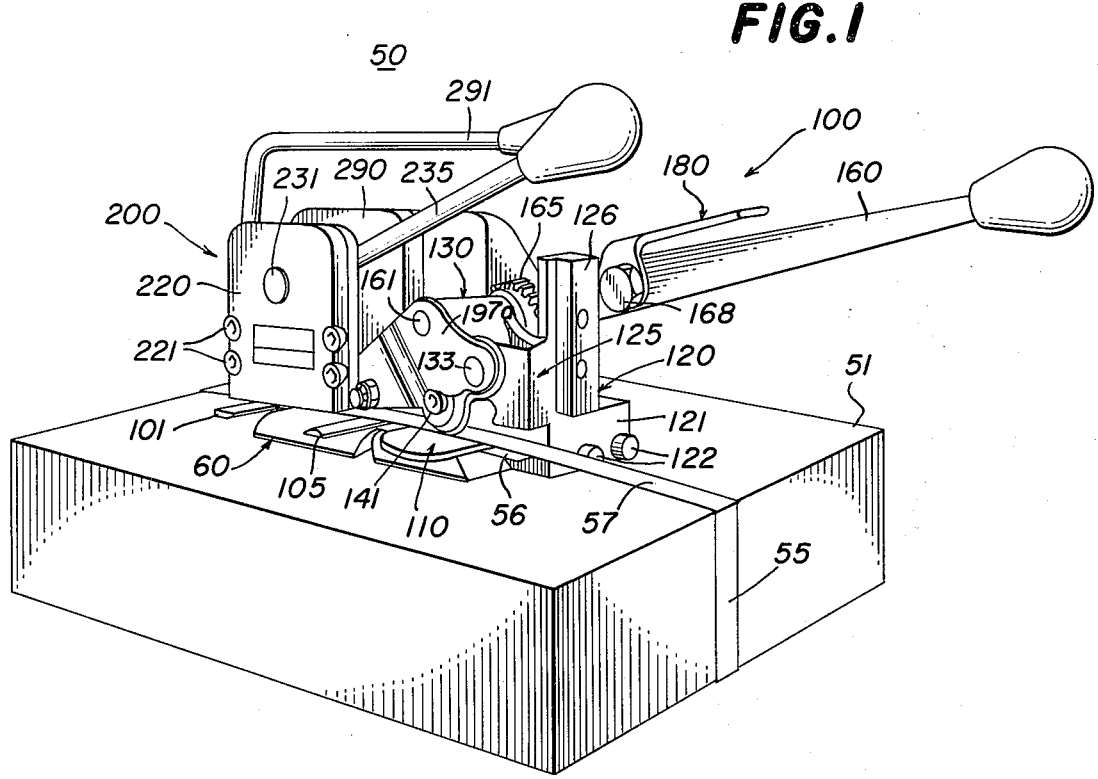
FIG. 1 is a front perspective view of the strapping apparatus of the present invention shown in its operative position for applying plastic strapping around an object.

Referring now in particular to FIGS. 1 through 3 of the drawings, there is illustrated a strapping apparatus consisting of a combination tensioning and heat sealing tool constructed in accordance with and embodying the features of the present invention, and generally designated by the numeral 50. In FIG. 1, the combination tool 50 is illustrated in its operative position for applying a length of plastic strap 55, such as polypropylene strap for example, in a tensioned loop about a package or other object 51, the strap 55 being disposed in the combination tool 50 so that the supply portion 57 of the strap is disposed in overlapping relationship with the leading end 56 thereof. The combination tool 50 includes a common base plate, generally designated by the numeral 60, on which is mounted gripping and tensioning apparatus, generally designated by the numeral 100, and heat-sealing and shearing apparatus, generally designated by the numeral 200.

Referring now also to FIGS. 4 through 15, 17 and 18 of the drawings, the base plate 60 includes a main body 61 of a predetermined thickness and having formed therein toward the rear portion thereof a generally L-shaped heater control recess 62 (see FIG. 16), and a generally rectangular tensioning apparatus recess 63 in the front portion thereof, the heater control recess 62 having a pair of spaced-apart parallel rails 70 therein extending laterally thereof (one shown in FIG. 16). Integral with the base plate 60 and projecting upwardly therefrom at the front end thereof is a cradle support mounting block 64. Formed along one side of the base plate 60 is a flat strap guide surface or apron 65 having formed in the front end thereof an internally threaded opening having threadedly disposed therein a strap rest button 68, for a purpose to be described more fully hereinafter. Formed in the base plate 60 between the strap guide apron 65 and the tensioning apparatus recess 63 are a pair of elongated slots 66 and 67, the purpose of which will be described below.

The gripping and tensioning apparatus 100 includes an elongated rear strap spacer 101 secured to the base plate 60 adjacent to the rear end thereof and projecting laterally therefrom at the rear end of the strap guide apron 65. The rear strap spacer 101 has a flat planar upper guide surface 102 and a flat planar lower guide surface 103 spaced apart a predetermined distance, both of the surfaces 102 and 103 being disposed substantially parallel to the strap guide apron 65 and spaced vertically therefrom. Formed along the front edge of the rear strap spacer 101 and extending substantially normal to the longitudinal axis of the strap guide apron 65 is a fixed shear blade 104. Secured to the base plate 60 and spaced a predetermined distance forwardly of the rear strap spacer 101 and extended substantially parallel thereto is an elongated front strap spacer 105 having upper and lower strap guide surfaces 106 and 107 which are respectively substantially coplanar with the strap guide surfaces 102 and 103 on the rear strap spacer 101.

Disposed adjacent to the front end of the strap guide apron 65 substantially parallel thereto is a separating plate, generally designated by the numeral 110, and fixedly secured adjacent to the inner end thereof by

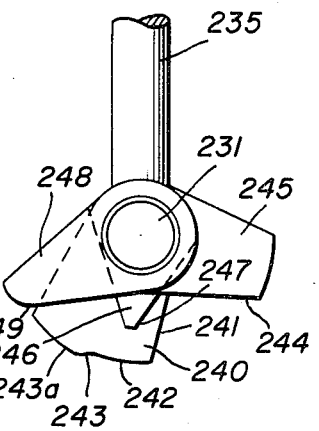
FIG.19
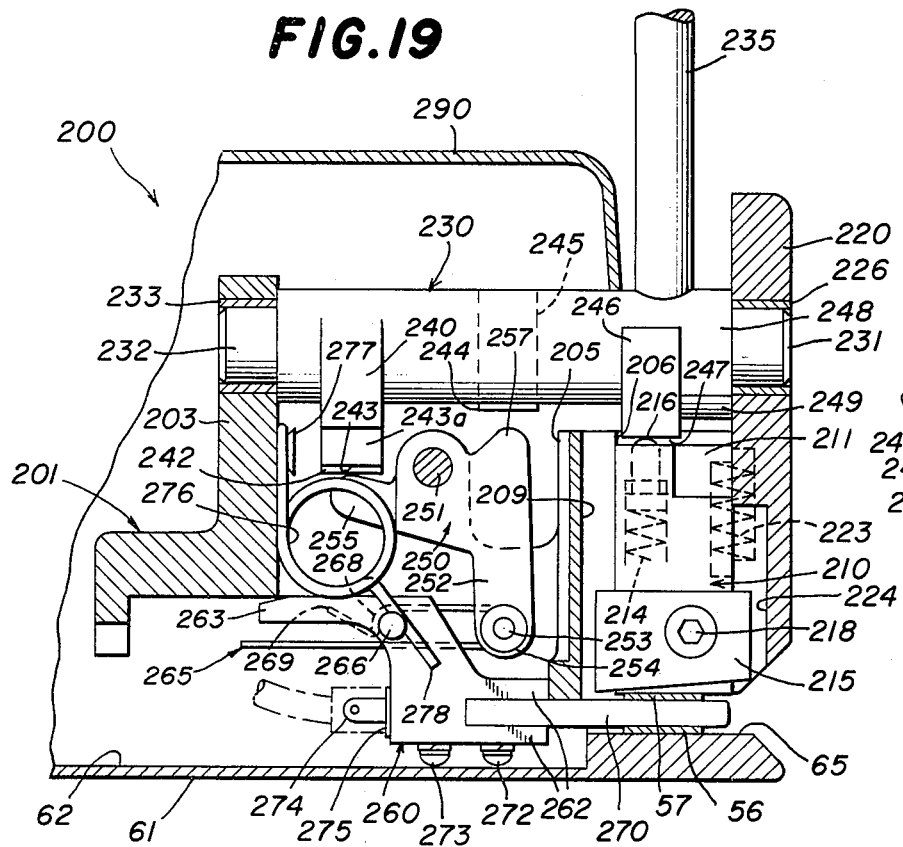
FIG.19A
FIG.20
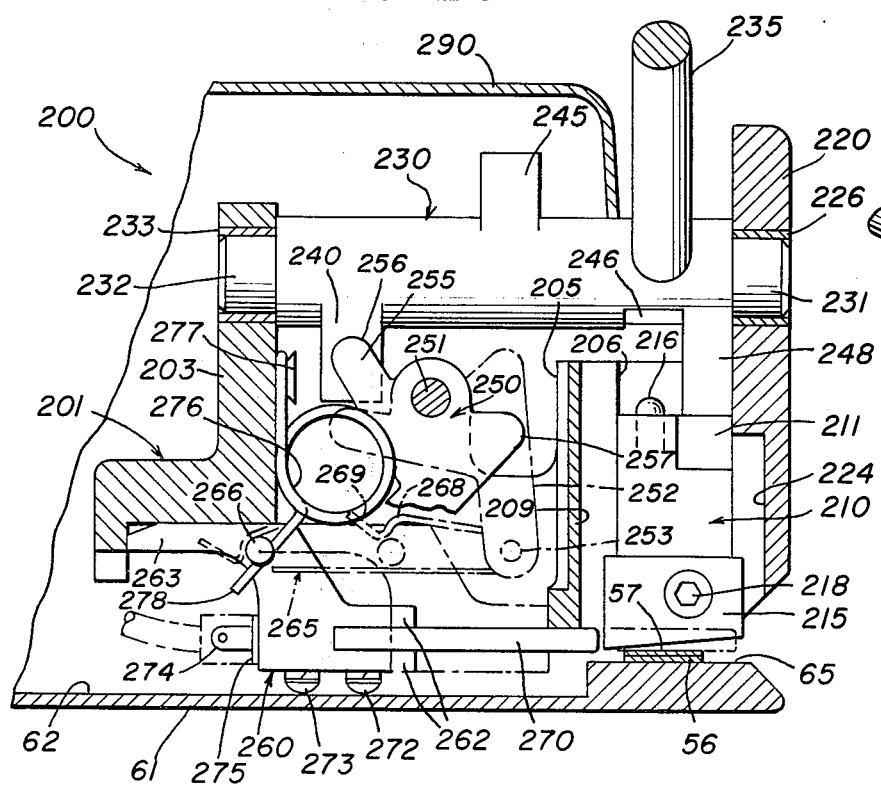
FIG.20A mentary openings adjacent to the lower ends of inner and outer elongated handle plates 162 and 163, the upper ends thereof having sandwiched therebetween the lower end of a tensioning handle 160. Formed on the outer handle plate 163 adjacent to the lower end thereof is a release projection 164 adapted for engagement with the shoulder 158 on the release plate 155 in a manner and for a purpose to be described below. Also coaxially mounted on the pivot pin 161 between the handle plates 162 and 163 is a drive gear 165 disposed for meshing engagement with the outer teeth on the drive gear 145, as is best illustrated in FIG. 14. The handle 160 and the handle plates 162 and 163 are all secured together by bolts 167 and 167a, the bolt 167 having a head 169, the bolt 167 having an enlarged spacer head 168.

The lower end of the tensioning handle 160 has a recess 166 formed in the inner side surface thereof, in which is received a pawl member, generally designated by the numeral 170, having an opening therein through which is received the bolt 167 for pivotaly mounting the pawl member 170. The pawl member 170 is provided with a pawl tooth 172 disposed for ratcheting engagement with the teeth of the drive gear 165 to prevent rotation thereof in a counterclockwise direction, as viewed in FIG. 14. Projecting outwardly from the opposite end of the pawl member 170 is a spring seat finger 173, for a purpose to be described more fully below. The lower end of the pawl member 170 projects downwardly and forwardly beneath the handle plates 162 and 163 and has formed thereon an arcuate seat 175 and a camming surface 176, the purpose of which will also be described below.

A positioning lever, generally designated by the numeral 180, has a flat side plate 181 which is disposed in use parallel to the inner handle plate 162 and is secured to the outer surface thereof by the bolt 167a for pivotal movement with respect thereto. Integral with side plate 181 and extending upwardly therefrom substantially normal thereto a predetermined distance above the tensioning handle 160 is a handle portion 182 for manipulating the positioning lever 180. Projecting downwardly and rearwardly from the side plate 181 is a stop finger 183 disposed for engagement with the head 169 of the bolt 167, for limiting pivotal movement of the positioning lever 180 in the counterclockwise direction, as viewed in FIGS. 2, 6 and 7. Projecting downwardly from the side plate 181 beneath the lower edge of the inner handle plate 162 is a generally U-shaped member 185, the outer leg of which forms a spring seat 186 in which is received the lower end of a compression spring 187, the upper end of the spring 187 being received in the spring seat on the finger 173, for simultaneously resiliently urging both the pawl member 170 and the positioning lever 180 toward rotation in a clockwise direction, as viewed in FIG. 14. The inner leg of the U-shaped portion 185 is provided with a camming surface 188 and a latch projection 189, for a it normally extends a predetermined distance beyond the head of the detent screw 192 for engagement with the enlarged head 168 of the bolt 167a when the tensioning handle 160 is moved downwardly. Integral with the latch plate 190 and projecting outwardly therefrom substantially normal thereto is a latch member 195 disposed for camming engagement with the cam surface 188 and for latching engagement with the latch projection 189 on the positioning lever 180 as the tensioning handle 160 is moved downwardly, all as is illustrated in FIGS. 6, 12, 14 and 15.

Respectively secured to the opposite ends of the cradle body 131 by means of screws 198 are two end plates 197 and 197a, the end plate 197 securely holding in place the pivot pins 133 and 161, the shaft 141, the holding pawls 150 and the release plate 155. Projecting downwardly from the rear end of the side plate 197a is a strap guide finger 199 which projects a slight distance downwardly below the surface of the strap apron 65 adjacent to the outer edge thereof for guiding the strap 55 and confining it to a path overlying the strap apron 65.

Referring now also to FIGS. 1 through 4 and 16 through 20A of the drawings, the sealing and shearing apparatus 200 will be described. The apparatus 200 is mounted on an irregularly shaped frame or housing 201 which is fixedly secured to the base plate 60 and overlies the heater control recess 62 therein. The frame 201 is provided with a relatively thick upwardly extending end wall 205 overlying the strap apron 65 and spaced a predetermined distance thereabove and a relatively thin upstanding end wall 207 adjacent to the opposite side of the base plate 65 and an upstanding bearing wall 203 disposed between the end walls 205 and 207 substantially parallel thereto. The bottom of the bearing wall 203 is disposed well above the base plate 60 and has formed thereon, at the side thereof facing the end wall 207, a downwardly extending lip or projection 202. Disposed between the end wall 205 and the bearing wall 203 are two longitudinally spaced-apart cylindrical bearing turrets 204 extending coaxially with each other and substantially parallel to the walls 203 and 205.

Formed in the outer surface of the end wall 205, between the front and rear strap spacers 105 and 101, is a deep slot or channel 206 substantially rectangular in transverse cross-section, the inner wall of the channel 206 in turn having formed therein adjacent to the rear end thereof a narrow elongated slot 209. The rear upper surface of the end wall 205 has an inclined surface 211 which slopes downwardly and forwardly to the channel 206, for a purpose to be described below.

Disposed in the channel 206 is a complementarily shaped pressure block, generally designated by the numeral 210, having at the upper rear end thereof an inclined cam surface 211 which slopes downwardly and rearwardly to the rear surface of the pressure block 210 adjacent to the lower edge of the inclined surface 208.

for engagement with a complementary shoulder (not shown) in the bore 211 for limiting the upward movement of the plunger 216 under the urging of the compression spring 214. Preferably, modulus of elasticity of the compression spring 214 is relatively high, the amount of force necessary to depress the plunger 216 against the urging of the bias spring 214 being variable by adjustment of the regulating screw 213.

A shear blade 215 is disposed in complementary recess 217 and the rear surfaces of the pressure block 210 and is fixedly secured thereto by means of the mounting screw 218, the inner end of the shear blade 215 projecting inwardly beyond the inner surface of the pressure block 210 and being accommodated in the slot 209. The shear blade 215 is disposed in use a very slight distance forwardly of the shear blade 104 on the rear strap spacer 101 for cooperation therewith to sever the supply portion of the strap in a manner to be described more fully below.

A generally rectangular end plate 220 is secured to the outer surface of the end wall 205 by mounting screws 221, the inner surface of the end plate 220 having formed therein a vertically extending part-cylindrical recess 222 receiving therein the outer portion of a vertically extending coil compression spring 223, the inner portion of which is received in a complementary part-cylindrical opening or recess 219 in the outer surface of the pressure block 210, the compression spring 223 serving to inhibit vertical movement of the pressure block 210. Also formed in the inner surface of the end plate 220 and extending upwardly from the bottom end thereof is an elongated slot 224 for accommodating therein the outer end of the shear blade 215 which projects outwardly beyond the outer surface of the pressure block 210. The end plate 220 extends a substantial distance upwardly above the upper surfaces of the end wall 205 and the pressure block 210 and has mounted thereon a roll pin 215 which extends inwardly of the end plate 220 a predetermined distance above the top of the end wall 205 for a purpose to be described below.

Figure 5:
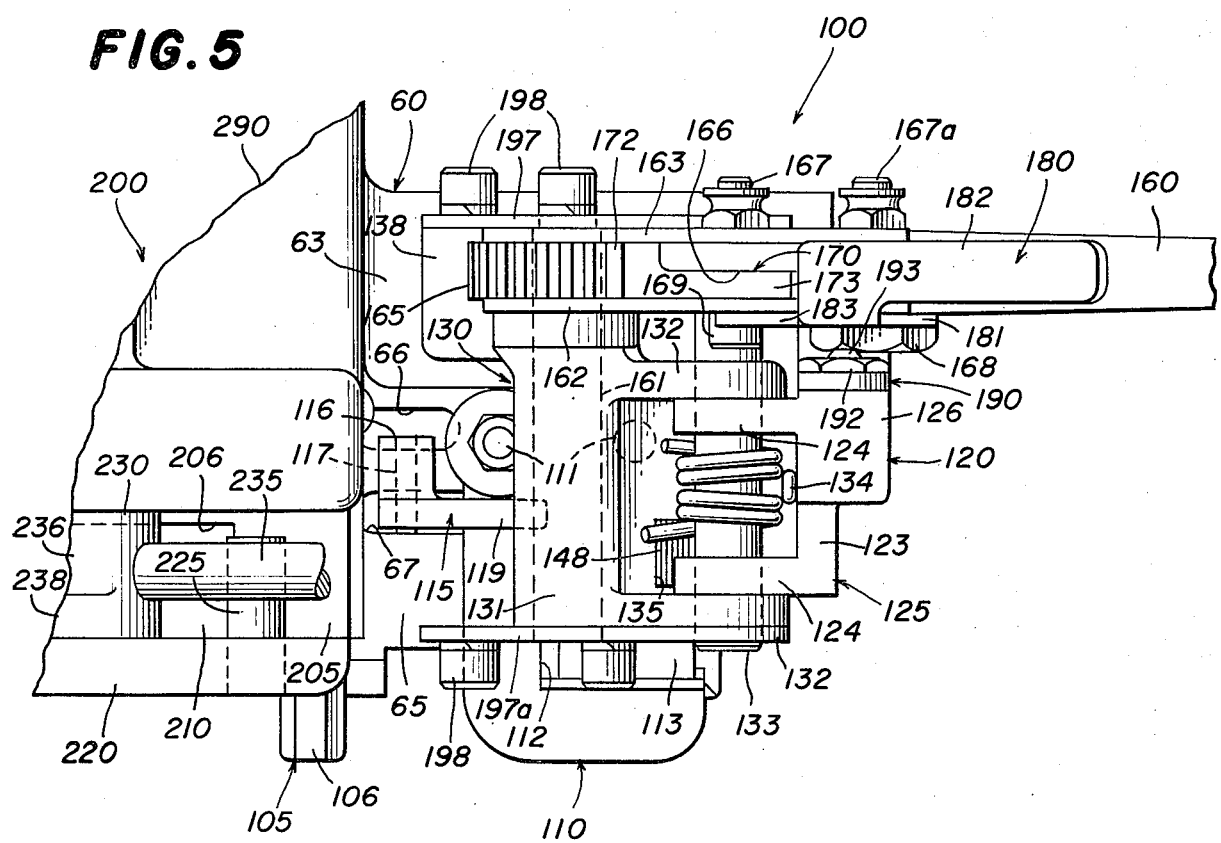
FIG. 5 is an enlarged fragmentary top plan view of the tensioning portion of the strapping apparatus illustrated in FIG. 3.

Also carried in the end plate 220 above the top of the end wall 205 and rearwardly of the roll pin 225 is a bearing 226 having journalled therein the reduced diameter end 231 of an elongated cam shaft 230 which extends inwardly of the end plate 220 substantially normal thereto, the opposite end of the cam shaft 230 also being provided with a reduced diameter portion 232 journalled in a bearing 233 in the bearing wall 203. A lever handle 235 is threadedly engaged with the cam shaft 230 and extends radially outwardly therefrom a slight distance inwardly of the end plate 220 for manually rotating the cam shaft 230 about the longitudinal axis thereof, the handle 235 being engageable with the roll pin 225, as best indicated in FIG. 5, for limiting the rotation of the cam shaft 230 in a clockwise direction, as viewed in FIG. 2. Projecting from the cam shaft 230 are a number of cam lobes including (progressing from the inner end to the outer end of the cam shaft 230) a heater drive lobe 240 having a drive cam surface 241 and a first dwell surface 242 and a retract cam surface 243 and a second dwell surface 243a thereon, a heater latching lobe 245 having a cam surface 244 thereon, a pressure block plunger lobe 246 having a cam surface 247 thereon and a pressure block sealing lobe 248 having a cam surface 249 thereon.

A rocker arm, generally designated by the numeral 250, is disposed between the bearing turrets 204, the rocker arm 250 being fixedly secured to an elongated pivot pin 251 extending therethrough, the opposite ends of which pin are respectively received in complementary openings extending coaxially through the turrets to 204 for pivotally mounting the rocker arm 250 thereon. The rocker arm 250 includes a downwardly extending coupling arm 252 having an opening therein through which is received a coupling bolt 253 secured in place by a nut 254. The rocker arm 250 is also provided with a drive cam member 255 projecting inwardly therefrom and having a camming surface 256 thereon disposed for engagement with the surfaces 241, 242, 243 and 243a of the cam lobe 240 on the cam shaft 230. The rocker arm 250 is also provided with a latch cam member 257 projecting upwardly and outwardly thereof and having thereon a camming surface (not shown) on the front side thereof disposed for engagement with the camming surface 244 of the cam lobe 245 on the cam shaft 230.

Disposed in the heater control recess 62 beneath the bearing wall 203 and the bearing turrets 204 is a heater carriage, generally designated by the numeral 260, provided with a pair of vertically spaced-apart flat retaining flanges 262 projecting therefrom toward the strap apron 65, the lower one of the retaining flanges 262 extending forwardly and rearwardly of the heater control recess 62 a sufficient distance so that the opposite ends thereof respectively rest upon the rails 70 for sliding engagement therewith. Formed in the heater carriage 260 is a generally rectangular connector recess 261 communicating with the space between the retaining flanges 262, the carriage 260 also having a pair of bearing arms 263 extending upwardly and outwardly therefrom in a direction opposite to the direction of the retaining flanges 262 and adapted for sliding engagement with the under side of the bearing wall 203, the distal ends of the bearing arms 263 being engageable with the lip 202 on the bearing wall 203 for limiting the sliding movement of the heater carriage 260 along the rails 70. The bearing arms 263 are spaced apart laterally of the heater carriage 260 (forwardly and rearwardly at the base plate 60) and are interconnected at the inner ends thereof by a relatively small diameter roll pin 264 and a relatively large diameter latch pin 266.

Also disposed between the bearing arms 263 is a latch clip, generally designated by the numeral 265, and preferably formed of spring steel, the clip 265 being generally U-shaped and having a bight portion wrapped around the coupling bolt 253 on the rocker arm 250 and a pair of legs extending outwardly toward the distal of the bearing arms 263. The upper one of the legs of the latch clip 265 is bent adjacent to the distal end thereof downwardly toward the lower leg of the clip 265 to form a hook portion 268, the lower end of the hook portion 268, the lower end of the hook portion 268 being normally spaced from the lower leg of the latch clip 265 a distance less than the diameter of the roll pin 264 and terminating in an upwardly inclined cam flange 269. Normally, the hook portion 268 of the latch clip 265 is hooked over the latch pin 266, as illustrated in FIG. 16, for coupling the heater carriage 260 to the rocker arm 250.

Figure 6:
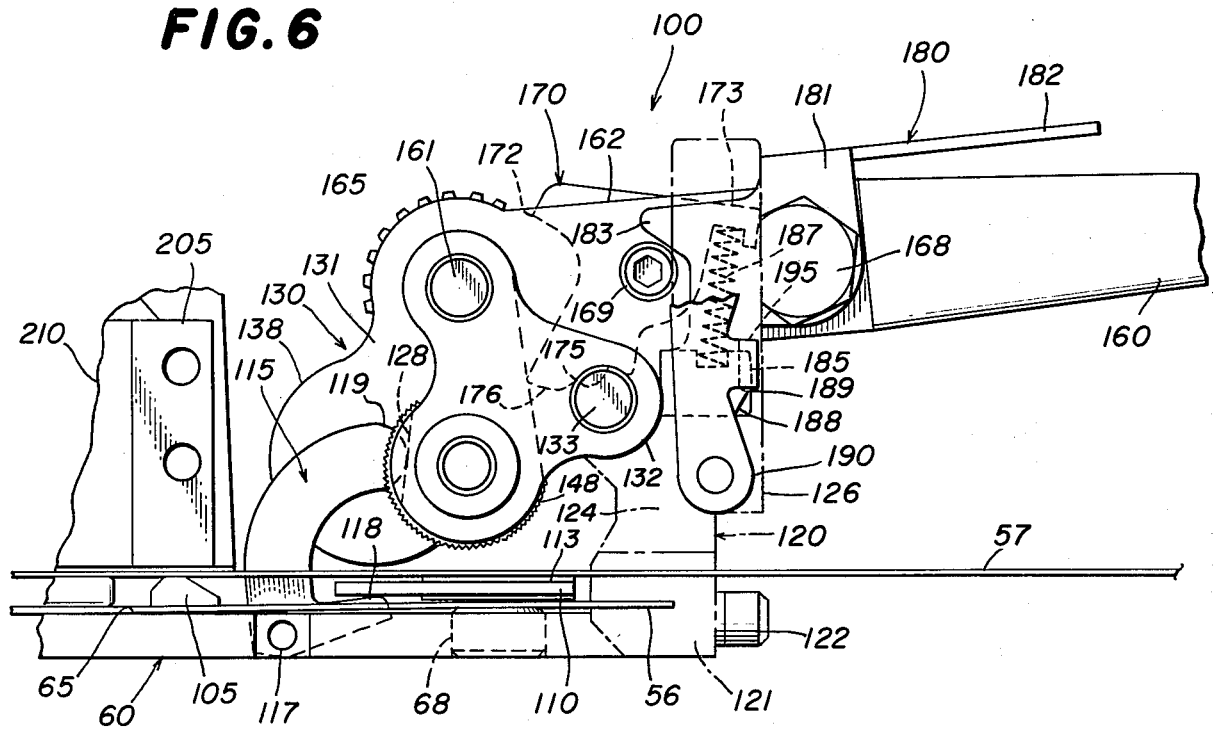
FIG. 6 is a fragmentary side elevational view of the tensioning portion of the strapping apparatus illustrated in FIG. 4, with the tensioning handle shown in the latched position thereof.
Figure 7:
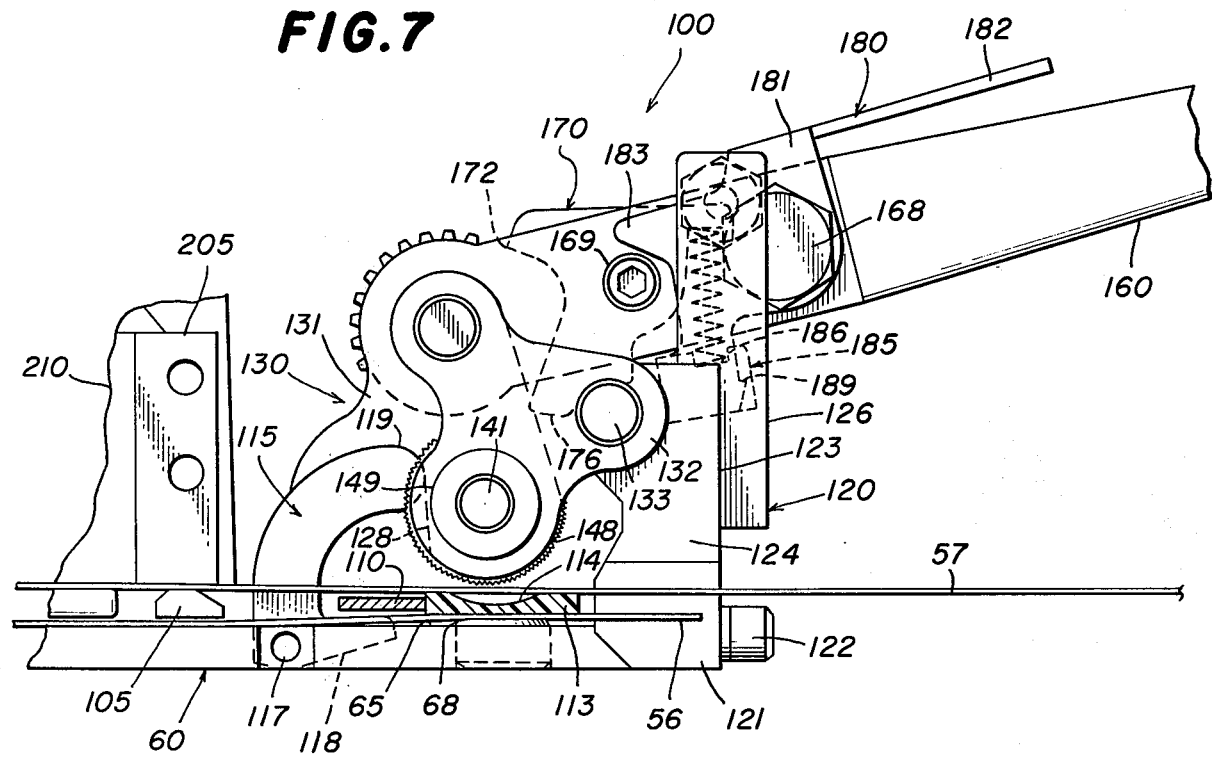
FIG. 7 is a fragmentary side elevational view similar to FIG. 6, with the tensioning handle shown in the detent position thereof.
Figure 8:
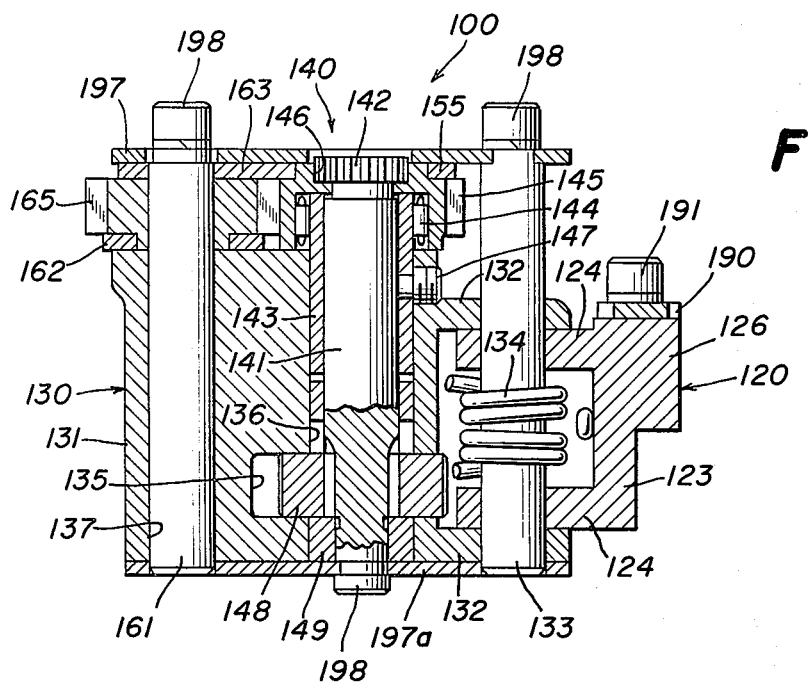
FIG. 8 is a cross-sectional view of the tensioning portion of the strapping apparatus of this invention, taken along the line 8—8 in FIG. 2.
Figure 10:
FIG. 10 is a side elevational view of one of the side plates of the tensioning portion of the strapping apparatus, taken along the line 10—10 in FIG. 9.
Figure 9:
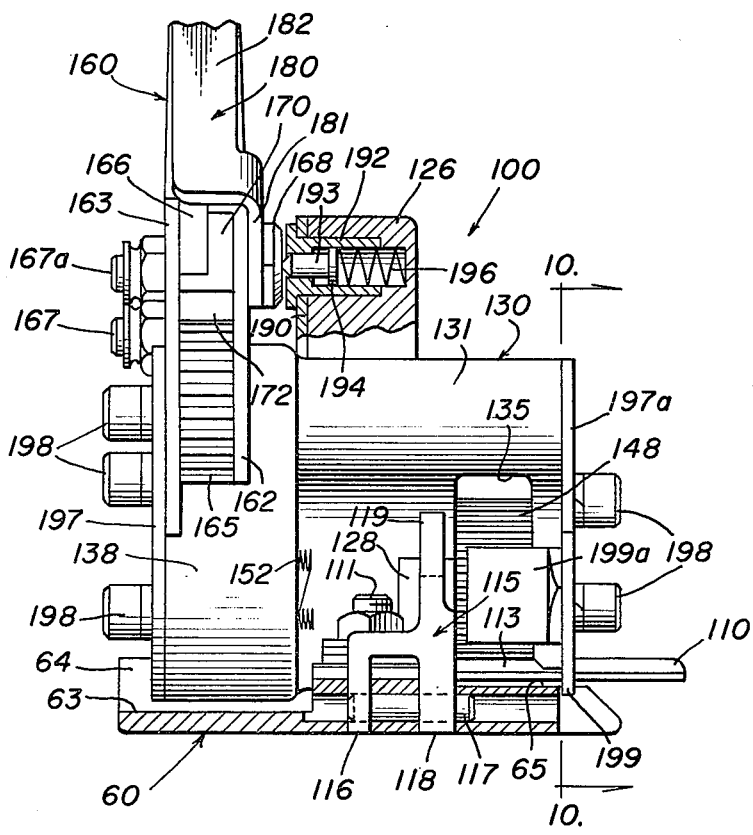
FIG. 9 is an end-elevational view in partial section of the tensioning portion of the strapping apparatus, taken along the line 9—9 in FIG. 2.
Figure 11:
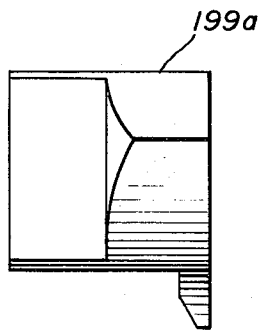
FIG. 11 is a further enlarged end elevational view of the strap guide nut illustrated in FIG. 9.

Disposed between the retaining flanges 262 of the heater carriage 260 substantially parallel thereto is an elongated electrically resistive heating element 270 projecting laterally well beyond the ends of the retaining flanges 262 toward the strap apron 65. The inner FIG. 1 is a front perspective view of the strapping apparatus of the present invention shown in its operative position for applying plastic strapping around an object;

FIG. 2 is a side elevational view of the strapping apparatus of FIG. 1, as viewed from the left-hand side thereof;

FIG. 3 is a top-plan view of the strapping apparatus shown in FIGS. 1 and 2;

FIG. 4 is an enlarged fragmentary side elevational view of the strapping apparatus of the present invention similar to FIG. 2 with the tensioning handle shown in an unlatched position and with the sealing handle shown in its home position and with portions of the apparatus removed more clearly to show the internal construction thereof;

FIG. 5 is an enlarged fragmentary top plan view of the tensioning portion of the strapping apparatus illustrated in FIG. 3;

FIG. 6 is a fragmentary side elevational view of the tensioning portion of the strapping apparatus illustrated in FIG. 4, with the tensioning handle shown in the latched position thereof;

FIG. 7 is a fragmentary side elevational view similar to FIG. 6, with the tensioning handle shown in the detent position thereof;

FIG. 8 is a cross-sectional view of the tensioning portion of the strapping apparatus of this invention, taken along the line 8—8 in FIG. 2;

FIG. 9 is an end-elevational view in partial section of the tensioning portion of the strapping apparatus, taken along the line 9—9 in FIG. 2;

FIG. 10 is a side elevational view of one of the side plates of the tensioning portion of the strapping apparatus, taken along the line 10—10 in FIG. 9;

FIG. 11 is a further enlarged end elevational view of the strap guide nut illustrated in FIG. 9;

FIG. 12 is a fragmentary side elevational view of the tensioning portion of the strapping apparatus illustrated in FIG. 4, as viewed from the opposite side thereof;

FIG. 13 is a fragmentary side elevational view similar to FIG. 12, with the side plate removed more clearly to show the construction of the holding pawl release mechanism;

FIG. 14 is a side elevational view similar to FIG. 12, with portions of the structure removed or broken away more clearly to show the construction of the drive gear mechanism and the handle latching mechanism;

FIG. 15 is a fragmentary side elevational view generally similar to FIG. 12, showing the tensioning handle in the latched position thereof;

FIG. 16 is an enlarged view in vertical section of the heat-sealing portion of the strapping apparatus taken along the line 16—16 in FIG. 3;

FIG. 17 is a fragmentary top-plan view in partial section of the strap-separating plate mechanism of the present invention, taken along the line 17—17 in FIG. 4;

FIG. 18 is a fragmentary view in vertical section of the separating plate mechamism, taken along the line 18—18 in FIG. 17;

FIG. 19 is a fragmentary view in vertical section similar to FIG. 16, illustrating the sealing apparatus in the strap-heating configuration thereof;

FIG. 19A is a fragmentary side elevational view of the cam shaft of the sealing mechanism in the configuration illustrated in FIG. 19;

FIG. 20 is a view similar to FIG. 19, showing the heat-sealing apparatus disposed in the sealing configuration thereof; and FIG. 20A is a side elevational view similar to FIG. 19A of the cam shaft in the configuration illustrated in FIG. 20.

Referring now in particular to FIGS. 1 through 3 of the drawings, there is illustrated a strapping apparatus consisting of a combination tensioning and heat sealing tool constructed in accordance with and embodying the features of the present invention, and generally designated by the numeral 50. In FIG. 1, the combination tool 50 is illustrated in its operative position for applying a length of plastic strap 55, such as polypropylene strap for example, in a tensioned loop about a package or other object 51, the strap 55 being disposed in the combination tool 50 so that the supply portion 57 of the strap is disposed in overlapping relationship with the leading end 56 thereof. The combination tool 50 includes a common base plate, generally designated by the numeral 60, on which is mounted gripping and tensioning apparatus, generally designated by the numeral 100, and heat-sealing and shearing apparatus, generally designated by the numeral 200.

Referring now also to FIGS. 4 through 15, 17 and 18 of the drawings, the base plate 60 includes a main body 61 of a predetermined thickness and having formed therein toward the rear portion thereof a generally L-shaped heater control recess 62 (see FIG. 16), and a generally rectangular tensioning apparatus recess 63 in the front portion thereof, the heater control recess 62 having a pair of spaced-apart parallel rails 70 therein extending laterally thereof (one shown in FIG. 16). Integral with the base plate 60 and projecting upwardly therefrom at the front end thereof is a cradle support mounting block 64. Formed along one side of the base plate 60 is a flat strap guide surface or apron 65 having formed in the front end thereof an internally threaded opening having threadedly disposed therein a strap rest button 68, for a purpose to be described more fully hereinafter. Formed in the base plate 60 between the strap guide apron 65 and the tensioning apparatus recess 63 are a pair of elongated slots 66 and 67, the purpose of which will be described below.

The gripping and tensioning apparatus 100 includes an elongated rear strap spacer 101 secured to the base plate 60 adjacent to the rear end thereof and projecting laterally therefrom at the rear end of the strap guide apron 65. The rear strap spacer 101 has a flat planar upper guide surface 102 and a flat planar lower guide surface 103 spaced apart a predetermined distance, both of the surfaces 102 and 103 being disposed substantially parallel to the strap guide apron 65 and spaced vertically therefrom. Formed along the front edge of the rear strap spacer 101 and extending substantially normal to the longitudinal axis of the strap guide apron 65 is a fixed shear blade 104. Secured to the base plate 60 and spaced a predetermined distance forwardly of the rear strap spacer 101 and extended substantially parallel thereto is an elongated front strap spacer 105 having upper and lower strap guide surfaces 106 and 107 which are respectively substantially coplanar with the strap guide surfaces 102 and 103 on the rear strap spacer 101.

Disposed adjacent to the front end of the strap guide apron 65 substantially parallel thereto is a separating plate, generally designated by the numeral 110, and fixedly secured adjacent to the inner end thereof by FIG. 4 to the detent position illustrated in FIG. 7, with the enlarged head 168 of the bolt 167a having passed beneath the detent member 193 and with the pivot pin 133 seated against the arcuate seat 175 on the pawl member 170, the projection 164 on the outer handle plate 163 engages the shoulder 158 on the release plate 155 for moving the latter to the right, as viewed in FIG. 13, and into engagement with the pawl teeth 153 of the holding pawls 150. This movement of the release plate 155 causes the arcuate surface 159 thereof to bear against the pawl teeth 153 and pivot them in a clockwise direction, as viewed in FIG. 13, against the urging of the torsion spring 152 and out of engagement with the outer teeth on the drive gear 145. Also, as was explained above, in this position, the pawl member 170 has been pivoted to bring the pawl tooth 172 up out of engagement with the drive gear 165. Thus, when the tensioning handle 160 is in its detent position illustrated in FIG. 7 or any position therebelow, both the drive gears 145 and 165 and the rotary dog 148 will be free to rotate in either direction, all for a purpose to be described more fully below.

When the tensioning handle 160 has been latched in the position illustrated in FIG. 6, the leading end 56 of a length of plastic strap 55 is inserted forwardly along the strap apron 65 and beneath the rear guide member 101 and the front guide member 105 and the raised separating plate 110 and inwardly of the raised guide projection 199 on the side plate 197a until the leading end 56 projects a slight distance forwardly of the separating plate 110, as is illustrated in FIG. 6. With the leading end 56 of the strap 55 thus positioned in the combination tool 50, the handle portion 182 of the positioning lever 180 is depressed toward the tensioning handle 160, thereby pivoting the positioning lever 180 about the axis of the bolt 167a against the urging of the compression spring 187 in a clockwise direction, as illustrated in FIG. 6, thereby moving the latch projection 189 out of latching engagement with the latch member 195 and releasing the tensioning handle 160 from its latched position.

The cradle 130 is now pivoted back downwardly in a counterclockwise direction, as viewed in FIG. 7, about the axis of the pivot pin 133 under the urging of the torsion spring 134 until the enlarged head 168 of the bolt 167a engages the projecting detent 193 in the position illustrated in FIG. 7. The modulus of elasticity of the detent compression spring 196 is such that the projecting detent 193 limits further upward movement of the tensioning handle 160 under the urging of the torsion spring 134, the application of further manual force to the tensioning handle 160 being necessary to depress the detent 193 and move the tensioning handle 160 back up past its detent position. The movement of the tensioning handle from its latched position back up to the position illustrated in FIG. 7 permits the lifting link 115 to be pivoted back in a clockwise direction, as viewed in FIG. 7, to its original position under the urging of the deflected separating plate 110, thereby permitting the deflecting plate 110 to return to its original position wherein it cooperates with the strap rest button 68 for securely clamping therebetween the leading end 56 of the strap. The strap rest button 68 is threadedly engaged in the base plate 60 and by appropriate adjustment of this screw-type button 68 the force with which the leading end 56 of the strap is clamped in place may be adjusted.

It will be noted that when the apparatus is in the position illustrated in FIG. 7, the cradle 130 has not been fully lowered to its original position and the rotary dog 148 remains spaced a slight distance above the separating plate 110 to accommodate the passage of the supply portion 57 of the strap therebetween. Also, it will be noted that in this position, the strap guide finger 199 on the side plate 197a will also be disposed a predetermined distance above the strap apron 65 to accommodate insertion of the supply portion 57 of the strap from the side of the tool 50. Thus, at this point, the supply portion 57 of the strap is slid into place between the separating plate 110 and the rotary dog 148 and above the rear guide member 101 and the front guide member 105. In this position, it will be noted that the portions of the leading end 56 and supply portion 57 of the strap extending between the front and rear guide members 101 and 105 are vertically spaced apart thereby and are disposed in overlapping relationship therebetween, all for a purpose to be described more fully below.

At this point, the tensioning handle 160 is manually pulled back up past the detent position thereof, thereby depressing the detent member 193 and pivoting the cradle 130 back down to its original position, as illustrated in FIG. 4, wherein the serrated peripheral surface of the rotary dog 148 is disposed in the arcuate recess 114 of the plastic insert 113 and cooperates therewith firmly to grip therebetween the supply portion 57 of the strap. It will be appreciated that the force with which the supply portion 57 of the strap engages the rotary dog 148 is also variable by appropriate adjustment of the strap rest button 68. When the tensioning handle 160 has been moved back to the positions illustrated in FIGS. 2 and 4, it will be noted that the strap guide finger 199 on the side plate 197a has been moved back down into its original position extending below the surface of the strap apron 65 for preventing the strap 55 from being displaced laterally from the combination tool 50.

In addition, it will be noted that as the tensioning handle 160 moves up past the detent position thereof, the cam surface 176 on the pawl member 170 rides back forwardly over the pivot pin 133, thereby permitting the pawl member 170 to be pivoted back in a clockwise direction, as viewed in FIG. 14, under the urging of the compression spring 187 to bring the pawl tooth 172 back into engagement with the teeth of the drive gear 165. Simultaneously, the projection 164 on the outer handle plate 163 is pulled up forwardly out of engagement with the shoulder 158 on the holding pawl release plate 155, thereby permitting the holding pawls 150 to pivot back in a counterclockwise direction, as viewed in FIG. 13, under the urging of the torsion spring 152 for pushing the release plate 155 back forwardly to its releasing position illustrated in FIG. 13, and permitting the holding pawl teeth 152 to re-engage the outer teeth of the drive gear 145.

At this point, the strap 55 which is looped about the object 51 may be tensioned by a back-and-forth movement of the tensioning handle 160 between the position illustrated in FIG. 4 and a rearward position in engagement with the plastic cover 290, the operator preferably operating the tensioning handle 160 with his left hand while he grips the handle 235 with his right hand. As the handle 160 is moved rearwardly, in a clockwise direction as viewed in FIG. 14, the drive gear 165 is rotated in a clockwise direction by engagement therewith of the pawl tooth 172, thereby resulting in a counterclcokwise rotation of the drive gear 145, all as shown in FIG. 14, with the holding pawl teeth 153 ratcheting over the teeth of the drive gear 145. This effects a corresponding rotation of the rotary dog shaft 141 and the rotary dog 148 for moving the supply portion 57 of the strap rearwardly of the combination tool 55, thereby taking up slack in the strap 55 and effecting tensioning thereof. When the tensioning handle 160 has reached the limit of its rearward travel, it is moved back forwardly to the position illustrated in FIG. 4 for another stroke, with the pawl tooth 172 ratcheting over the teeth of the drive gear 165 during this forward movement of the handle 160, retrograde rotation of the drive gear 145 being prohibited by the holding pawls 150. This tensioning operation continues until the desired tension in the strap 55 has been achieved.

If, during the operation of the combination tool 50, it is desired to adjust or reposition the strap 55 in the tool 50, the tensioning handle 160 is moved back down to the detent position thereof illustrated in FIG. 7, in which position the holding pawl release plate 155 is moved rearwardly to disengage the holding pawls 150 and the pawl member 170 is moved out of engagement with the drive gear 165, all as was described above. In this position, while the supply portion 57 of the strap will remain gripped between the rotary dog 148 and the plastic insert 113, the rotary dog 148 will be freely rotatable in either direction, thereby facilitating longitudinal movement of the supply portion 57 of the strap while maintaining positive engagement thereof with the rotary dog 148 and while maintaining the lead leading end 56 of the strap firmly clamped between the plastic insert 113 and the strap rest button 68.

When the strap 55 has been sufficiently tensioned, the operator grips the tensioning handle 160 with his left hand and grips the cam shaft lever handle 235 with his right hand and moves the handle 235 rearwardly in a counterclockwise direction, as viewed in FIG. 4, for sealing the overlapping portions 56 and 57 of the strap and severing the supply portion thereof. Preferably, the sealing and shearing operation is effected by a single continuous movement of the handle 235 from the position illustrated in FIGS. 1 through 5 to the position illustrated in FIG. 20, which movement preferably takes approximately 2 seconds, thereby effecting a counterclockwise rotation of the cam shaft 230, as viewed in FIG. 4, for sequentially effecting a series of operations.

When the lever handle 235 is in its initial or home position, illustrated in FIGS. 1 through 4 and 16, it rests upon the roll pin 225, with none of the cam lobes on the cam shaft 230 being in engagement. The latch clip 265 is clipped over the latch pin 266 for coupling the heater carriage 260 to the rocker arm 250, and the heater carriage 260 is held in its retracted position with the distal ends of the bearing arms 263 in engagement with the lip 202 on the bearing wall 203 by the action of the return spring 276, thereby holding the heater element 270 retracted from between the overlapping portions of the strap 56 and 57 and holding the rocker arm 250 back in the position illustrated in FIG. 16. The pressure block 210 is held with the upper surfaces thereof substantially flush with the upper surface of the end wall 205 by the action of the compression spring 223, with the movable shear blade 215 being disposed above and out of engagement with the supply portion 57 of the strap. The plunger 216 projects upwardly above the top surface of the pressure block 210 under the urging of the compression spring 214.

During about the first 30° of the rearward movement of the handle 235, the cam surface 241 on the cam lobe 240 engages the cam surface 256 on the rocker arm drive cam 255 to effect a cammed pivotal movement of the rocker arm 250 in a counterclockwise direction about the axis of the pivot pin 251, as viewed in FIG. 16, thereby sliding the heater carriage 260 along the rails 70 to the right, as viewed in FIG. 16, under the coupling action of the latch clips 265, for moving the distal end of the heating element 270 between the spaced-apart overlapping portions 56 and 57 of the strap in the region between the front and rear strap spacers 105 and 101. As the heating element 270 is being moved between the portions 56 and 57 of the strap, the cam surface 247 on the cam lobe 246 engages the projecting plunger 216, the modulus of elasticity of the compression spring 214 being greater than that of the compression spring 223 so that the camming engagement between the cam surface 247 and the plunger 216 effects a downward movement of the pressure block 210 against the urging of the compression spring 223, while the plunger 216 remains substantially undepressed with respect to the pressure block 210. The pivotal movement of the rocker arm 250 of the heating element 270 continues until the arcuate dwell surface 242 on the cam lobe 240 engages the rocker arm drive cam 255, at which point the heating element 270 is fully extended between the strap portions 56 and 57 in the position illustrated in FIG. 19, with the distal end of the upper retaining flange 262 bearing against the inner surface of the end wall 205 for limiting the outward movement of the heater carriage 260 and the heating element 270.

As the backward motion of the handle 235 continues, and while the dwell surface 242 of the cam lobe 240 rides over the rocker arm drive cam 255, the pressure block 210 bottoms out against the supply portion 57 of the strap and cooperates with the strap apron 65 for firmly pressing therebetween the overlapping portions 56 and 57 of the strap with the heater element 270 therebetween. The force with which the heater element 270 and the strap portions 56 and 57 are pressed together is limited by the compression spring 214, force applied by the cam lobe 246 beyond a predetermined force serving to depress the plunger 216 and thus be absorbed by the compression spring 214. The predetermined force at which the plunger 216 is depressed can be varied by appropriate adjustment of the regulating screw 213, as was described above. When the overlapping portions 56 and 57 of the strap are thus firmly pressed into contact with the heating elements 270, the surfaces thereof in contact with the heating element 270 are melted. It will be noted that when the pressure block 210 is thus held in its strap-heating position, the shear blade 215 remains up out of contact with the supply portion 57 of the strap.

As the rearward movement of the handle 235 continues, the cam surface 247 on the cam lobe 246 moves past the plunger 216 permitting it to return to its projecting position and then permitting the pressure block 210 to return upwardly to its original position out of contact with the strap supply portion 57 under the urging of the compression spring 223. Simultaneously, the camming surface 243 on the cam lobe 240 is brought into engagement with the rocker arm drive cam 255 for effecting a further counterclockwise pivotal movement of the rocker arm 250, as viewed in FIG. 19. However, since further outward movement of the heater carriage 260 is prevented by engagement of the retaining flange 262 with the end wall 205, this further pivotal movement of the rocker arm 250 results in the hook portion 268 of the latch clip 265 being cammed up over the latch pin 266 to permit the latch pin 266 to pass therebeneath. As soon as the hook portion 268 has cleared the latch pin 266, the heater carriage 260 is snapped back into its retracted position illustrated in FIG. 16, under the urging of the return spring 276. A further slight rearward movement of the handle 235 brings the second dwell surface 243a on the cam lobe 240 into engagement with the rocker arm cam 255 for holding the locker arm 250 in the position illustrated in broken line in FIG. 20.

As the rearward movement of the handle 235 continues, the cam surface 249 of the cam lobe 248 is brought into camming engagement with the cam surface 211 on the pressure block 210, again forcing the pressure block 210 downwardly against the urging of the compression spring 223. As this downward movement of the pressure block 210 continues, the melted surfaces of the overlapping portions 56 and 57 of the strap are brought into engagement with each other and are firmly pressed together between the pressure block 210 and the strap apron 65 to effect a firm heat-sealed joint between the overlapping strap portions 56 and 57. The pressure with which the strap portions 56 and 57 are pressed together is controlled by the amount of force applied to the handle 235 by the operator. As the pressure block 210 bottoms out, in the position illustrated in FIG. 20, the shear blade 215 passes downwardly past the shear blade 104 and cooperates therewith to sever the supply portion 57 of the strap at the rear guide member 201.

At this point, the heat-sealed joint in the strap 55 has been completed and the operator moves the tensioning handle 160 with his left hand all the way forward to the latched position, for again elevating the cradle 130 and the separating plate 110 and the strap guide finger 199 to permit removal of the strap 55 from the strap-gripping apparatus 100. Then, with his right hand, the operator moves the sealing lever handle 235 back to the forward position thereof illustrated in FIGS. 4 and 16, thereby permitting the pressure block 210 to return upwardly to its original position under the urging of the compression spring 223. This forward movement of the handle 235 also brings the camming surface 244 of the cam lobe 245 into engagement with the latch cam 257 on the rocker arm 250 for pivoting the rocker arm 250 in a clockwise direction from the broken line position to the solid line position illustrated in FIG. 20. As the rocker arm 250 pivots back to its original position, the cam flange 269 on the latch clip 265 engages the roll pin 264 on the heater carriage 260 and rides up thereover, slightly separating the legs of the latch clip 265 and bringing the cam flange 269 into position for camming engagement with the latch pin 266. The cam flange 269 then rides up over the latch pin 266 and therebehind for relatching the latch clip 265 in place for coupling the rocker arm 250 to the heater carriage 260. With the handles 235 and 160 now returned to their forwardmost positions, the combined tool 50 can be moved sideways to strip it from the strap 55 and the object 51 by use of the utility handle 291.

In a preferred embodiment of the invention, the combination tool 50 is constructed primarily of metal, with the cover 290 being preferably formed of a self-extinguishing vinyl plastic. More particularly, the cradle support member 120, the tensioning handle 160, the frame 201, the end plate 220 and the heater carriage 260 are all preferably formed of aluminum alloy to facilitate the dissipation of heat from the apparatus, the cradle 130 is formed of cast iron and the remaining parts of the tool 50 being preferably formed of steel, with the exception of the nylon insert 113. It will, however, be appreciated that other suitable materials may be used for the construction of the combination tool 50. The heater element 270 is preferably formed of a metal sheath having electrically resistive heating coils disposed therein, with the element capable of producing a surface temperature of at least 725° Fahrenheit in the area of the heating coils, when energized from a 110–120 VAC 60 Hz. electric power source.

It will be observed that, as a principal advantage of the present invention, the heat sealing and shearing cycle which results from the rotation of the cam shaft 230 is characterized by the fact that after melting of the overlapping strap portions 56 and 57 by the pressing therebetween of the heater element 270, the pressure block 210 is raised and the heater element is quickly and completely removed from between the strap portions 56 and 57 and from contact therewith prior to pressing together of the melted overlapping strap portions 56 and 57 to form the bonded heat-sealed joint. Thus, the overlapping strap portions are heated uniformly and simultaneously for the same amount of time across the entire width thereof and the melted portions are pressed together simultaneously across the entire width thereof to insure formation of a heat-sealed joint which is uniform across the entire width of the overlapping portions of the strap 56 and 57.

It will also be noted that the combination tool 50 has been constructed for ease of assembly and disassembly to facilitate servicing and cleaning of the tool and replacement of parts thereof.

From the foregoing, it can be seen that there has been provided an improved combination strapping tool for both gripping and tensioning a length of plastic strap about an object and then forming a heat-sealed bonded joint between the ends of the length of strap and severing the length of strap from the supply thereof.

There has also been provided an improved heat-sealing and shearing apparatus for plastic strapping, wherein the facing surfaces of the overlapping portions of the strap are melted by a heating element disposed therebetween, and where the heating element is completely removed from between the strap portions prior to joinder thereof.

There has also been provided a novel cam-actuated drive arrangement for inserting the heating element between the overlapping strap portions and retracting the heating element and for pressing together the overlapping portions of the strap. More particularly, there has been provided a novel heater element drive mechanism, wherein the heater element is resiliently urged to a retracted position, and including a releasable coupling latch, whereby after the drive mechanism has moved the heating element to the strap heating position between the overlapping portions of the strap, the drive mechanism is unlatched from the heating element, which thereupon is retracted under the urging of the bias means.

In addition, there has been provided a novel heat-sealing and shearing apparatus which is provided with a cooling and ventilating fan for directing a stream of cooling air over the apparatus to facilitate displacement of heat therefrom and remove vapors therefrom.

While there has been described what has been considered to be the preferred embodiment of the invention, it will be understood that various modifications may be made therein, and it is intended to cover in the appended claims all such modifications that fall within the true spirit and scope of the invention.

What is claimed is:

1. Strapping apparatus for securing a length of plastic strap around an object, said apparatus comprising a frame, strap-gripping means mounted on said frame for holding the strap encircled in a loop in a tensioned condition about the object with the leading end of the strap overlapping and spaced from the supply portion thereof, two substantially parallel strap guides spaced apart longitudinally of said strap and disposed substantially normal to the longitudinal axis thereof, each of said strap guides being disposed in use between and for contact with both of the overlapping portions of the strap to maintain a predetermined separation therebetween and cooperating therewith and with each other to define a sealing region, a heating element movable in directions substantially normal to the longitudinal axes of the overlapped portions of the strap between a strapheating position and a retracted position, said heating element in the strap-heating position thereof being disposed in said sealing region between the overlapping portions of the strap for contact therewith to effect melting thereof, said heating element in the retracted position thereof being displaced from between the overlapping portions of the strap and out of contact therewith, bias means mounted on said frame and resiliently urging said heating element toward the retracted position thereof, actuating means mounted on said frame and releasably coupled to said heating element and movable in a predetermined direction for effecting movement of said heating element from the retracted position to the strap-heating position thereof, further movement of said actuating means in said predetermined direction effecting release of said actuating means from said heating element thereby to permit return of said heating element to the retracted position thereof under the urging of said bias means, and pressure means carried by said frame for pressing together the melted overlapping portions of the strap to effect a joint therebetween after the return of said heating element to the retracted position thereof, whereby there is provided uniform heating of the overlapped portions of the strap and the formation of a uniform joint therebetween.

2. Strapping apparatus for securing a length of plastic strap around an object, said apparatus comprising a frame, strap-gripping means mounted on said frame for holding the strap encircled in a loop in a tensioned condition about the object with the leading end of the strap overlapping and spaced from the supply portion thereof, a heating element movable between a strap-heating position and a retracted position, said heating element in the strap-heating position thereof being disposed between the overlapping portions of the strap for contact therewith to effect melting thereof, said heating element in the retracted position thereof being displaced from between the overlapping portions of the strap and out of contact therewith, bias means mounted on said frame and resiliently urging said heating element toward the retracted position thereof, stop means carried by said frame for preventing further movement of said heating element away from the retracted position thereof when said heating element is in the strap heating position thereof, latch mechanism movable between a latched condition yieldably coupled to said heating element for movement therewith and an unlatched condition decoupled from said heating element, actuating means mounted on said frame and coupled to said latch mechanism and movable among a home configuration for holding said latch mechanism in the latched condition thereof and a heating configuration and a sealing configuration, movement of said actuating means from the home configuration thereof to the heating configuration thereof effecting movement of said heating element from the retracted position thereof to the strap-heating position thereof against the urging of said bias means, movement of said actuating means from the heating configuration to the sealing configuration thereof urging said latch mechanism and said heating element with increased force away from the retracted position thereof and causing said latch mechanism to yield for effecting movement thereof from the latched condition to the unlatched condition thereof thereby to permit return of said heating element to the retracted position thereof under the urging of said bias means, and pressure means carried by said frame for pressing together the melted overlapping portions of the strap to effect a joint therebetween after the return of said heating element to the retracted position thereof, movement of said actuating means from the sealing configuration back to the home configuration thereof effecting movement of said latch mechanism from the unlatched condition thereof back to the latched condition thereof, whereby there is provided uniform heating of the overlapped portions of the strap and the formation of a uniform joint therebetween.

3. The strapping apparatus set forth in claim 2, wherein said actuating means includes a manually operable lever, and cam mechanism responsive to movement of said lever for effecting movement of said latch mechanism.

4. The strapping apparatus set forth in claim 2, wherein said latch mechanism includes a generally U-shaped spring clip having a bight portion coupled to said actuating means and a pair of arms having free ends thereof resiliently urged together, and a latch pin coupled to said heating element and disposed between the arms of said clip intermediate the bight portion and the free ends thereof when said latch mechanism is in the latched condition thereof, movement of said actuating means from the heating configuration to the sealing configuration thereof causing said latch pin to be forced between the free ends of said clip for moving said mechanism to the unlatched condition thereof.

5. The strapping apparatus set forth in claim 2, and further including a movable heater carriage coupled to said latch mechanism, said heating element being securely mounted in said heater carriage for movement therewith.

6. The strapping apparatus set forth in claim 2, and further including a movable heater carriage coupled to said latch mechanism, said heating element being securely mounted in said heater carriage for movement therewith, and an electrical connector mounted on said heater carriage and electrically coupled to said heating element and adapted to be coupled to an associated source of electrical power for energizing said heating element.

7. Strapping apparatus for securing a length of plastic strap around an object, said apparatus comprising a frame, strap-gripping means mounted on said frame for holding the strap circled in a loop in a tensioned condition about the object with the leading end of the strap overlapping and spaced from the supply portion thereof, a heating element movable between a strap-heating position and a retracted position, said heating element in the strap-heating position thereof being disposed between the overlapping portions of the strap for contact therewith to effect melting thereof, said heating element in the retracted position thereof being displaced from between the overlapping portions of the strap and out of contact therewith, bias means mounted on said frame and resiliently urging said heating element toward the retracted position thereof, stop means carried by said frame for preventing further movement of said heating element away from the retracted position thereof when said heating element is in the strap heating position thereof, latch mechanism movable between a latched condition yieldably coupled to said heating element for movement therewith and an unlatched condition decoupled from said heating element, a pressure member carried by said frame and movable between a pressing condition in contact with the strap for urging together the overlapping portions thereof and a releasing condition out of contact with the strap, and actuating means mounted on said frame and coupled to said latch mechanism and to said pressure member and being movable among a home configuration for holding said latch mechanism in the latched condition thereof and a heating configuration and a releasing configuration and a sealing configuration, movement of said actuating means from the home configuration to the heating configuration thereof effecting movement of said heating element from the retracted position to the strap-heating position thereof and effecting a first movement of said pressure member from the releasing condition to the pressing condition thereof firmly to press together said heating element and the overlapping portions of the strap for melting thereof, movement of said actuating means from the heating configuration to the releasing configuration thereof effecting movement of said pressure member back to the releasing condition thereof and urging said latch mechanism and said heating element with increased force away from the retracted position thereof and causing said latch mechanism to yield for effecting movement thereof from the latched condition to the unlatched condition thereof thereby to permit return of said heating element to the retracted position thereof under the urging of said bias means, movement of said actuating means from the releasing configuration to the sealing configuration thereof effecting a second movement of said pressure member from the releasing condition to the pressing condition thereof for pressing together the melted overlapping portions of the strap to form a joint therebetween, movement of said actuating means from the sealing configuration back to the home configuration thereof effecting movement of said latch mechanism from the unlatched condition back to the latched condition thereof, whereby there is provided uniform heating of the overlapped portions of the strap and the formation of a uniform joint therebetween.

8. The strapping apparatus set forth in claim 7, and further including second bias means resiliently urging said pressure member toward the releasing condition thereof, said actuating means being engageable with said pressure member for effecting movement thereof to the pressing condition thereof against the urging of said second bias means during movement of said actuating means from the home configuration to the heating configuration thereof, said actuating means disengaging from said pressure member to permit movement thereof back to the releasing condition thereof under the urging of said second bias means during movement of said actuating means from the heating configuration to the sealing configuration thereof.

9. The strapping apparatus set forth in claim 7, and further including second bias means resiliently urging said pressure member toward the releasing condition thereof, a first cam member carried by said pressure member, and a second cam member carried by said actuating means and adapted for camming engagement with said first cam member during movement of said actuating means from the home configuration to the heating configuration thereof for effecting movement of said pressure member to the pressing condition thereof against the urging of said second bias means, movement of said actuating means from the heating configuration to the releasing configuration thereof effecting disengagement of said first and second cam members thereby to permit return of said pressure member to the releasing condition thereof under the urging of said second bias means.

10. The strapping apparatus set forth in claim 7, wherein said actuating means includes a manually operable lever, said actuating means being movable from the home condition configuration thereof sequentially to the heating and releasing and sealing configurations thereof in response to a single continuous movement of said lever in a predetermined direction.

11. Strapping apparatus for securing a length of plastic strap around an object, said apparatus comprising a frame, strap-gripping means mounted on said frame for holding the strap encircled in a loop in a tensioned condition about the object with the leading end of the strap overlapping and spaced from the supply portion thereof, a heating element movable between a strap-heating position and a retracted position, said heating element in the strap-heating position thereof being disposed between the overlapping portions of the strap for contact therewith to effect melting thereof, said heating element in the retracted position thereof being displaced from between the overlapping portions of the strap and out of contact therewith, a pressure member carried by said frame and movable between a pressing condition in contact with the strap for urging together the overlapping portions thereof and a releasing condition out of contact with the strap, stop means on said frame limiting movement of said pressure member in a pressing direction when said pressure member is in the pressing condition thereof, actuating means mounted on said frame and coupled to said heating element and to said pressure member and being movable among a home configuration and a heating configuration and a sealing configuration, movement of said actuating means from the home configuration to the heating configuration thereof effecting movement of said heating element from the retracted position to the strap-heating position thereof and effecting a first movement of said pressure member from the releasing condition to the pressing condition thereof firmly to press together said heating element and the overlapping portions of the strap for melting thereof, and pressure-regulating means carried by said pressure member for engagement with said actuating means during the movement thereof from the home configuration to the heating configuration thereof, said pressure-regulating means being movable by said actuating means with respect to said pressure member when said pressure member is in the pressing condition thereof for absorbing force applied to said pressure member in excess of a predetermined force to limit the pressure with which said heating element and the overlapping portions of the strap are pressed together, movement of said actuating means from the heating configuration to the sealing configuration thereof sequentially effecting movement of said pressure member back to the releasing condition thereof and movement of said heating element back to the retracted position thereof and a second movement of said pressure member to the pressing condition thereof for pressing together the melted overlapping portions of the strap to form a joint therebetween, movement of said actuating means from the sealing configuration thereof back to the home configuration thereof effecting movement of said latch mechanism from the unlatched condition back to the latched condition thereof, whereby there is provided uniform heating of the overlapping of the strap and the formation of a uniform joint therebetween.

12. The strapping apparatus set forth in claim 11, wherein said pressure regulating means includes means for selectively varying the predetermined force.

13. The strapping apparatus set forth in claim 11, wherein said pressure regulating means includes a first cam member carried by said pressure member and movable with respect thereto between a camming position and a force absorbing position, bias means yieldably urging said first cam member toward the camming position thereof, with a predetermined force and further including a second cam member carried by said actuator means and adapted for camming engagement with said first cam member during movement of said actuating means from the home configuration to the heating configuration thereof for effecting a cammed movement of said pressure member to the pressing condition thereof, movement of said actuating means toward the heating configuration thereof after said pressure member has reached the pressing condition thereof serving to increase the force applied to said first cam member thereby to increase the pressure applied to the strap by said pressure member until the force applied to said first cam member exceeds said predetermined force at which point said bias means yields to accommodate movement of said first cam member to the pressure limiting position thereof.

14. Strapping apparatus for securing a length of plastic strap around an object, said apparatus comprising a frame, strap-gripping means mounted on said frame for holding the strap encircled in a loop in a tensioned condition about the object with the leading end of the strap overlapping and spaced from the supply portion thereof, a heating element movable between a strap-heating position and a retracted position, said heating element in the strap-heating position thereof being disposed between the overlapping portions of the strap for contact therewith to effect melting thereof, said heating element in the retracted position thereof being displaced from between the overlapping portions of the strap and out of contact therewith, actuating means mounted on said frame and coupled to said heating element for effecting movement thereof between the retracted position and the strap-heating position thereof, pressure means carried by said frame for pressing together the melted overlapping portions of the strap to effect a joint therebetween after the return of said heating element to the retracted position thereof, and cooling and ventilating means mounted on said frame for directing a stream of cooling air over said heating element and said actuating means and said pressure means for cooling thereof and for removal of vapors resulting from the melting of the overlapping portions of the strap, whereby there is provided uniform heating of the overlapped portions of the strap and the formation of a uniform joint therebetween.

15. The strapping apparatus set forth in claim 14, wherein said cooling and ventilating means comprises an electrically driven fan.

16. The strapping apparatus set forth in claim 14, wherein portions of said frame are constructed of aluminum to facilitate dissipation of heat generated by said heating element.

17. Strapping apparatus for securing a length of plastic strap around an object, said apparatus comprising a frame, strap-gripping means mounted on said frame for holding the strap encircled in a loop in a tensioned condition about the object with the leading end of the strap overlapping and spaced from the supply portion thereof, a heating element movable between a strap-heating position and a retracted position, said heating element in the strap-heating position thereof being disposed between the overlapping portions of the strap for contact therewith to effect melting thereof, said heating element in the retracted position thereof being displaced from between the overlapping portions of the strap and out of contact therewith, bias means mounted on said frame and resiliently urging said heating element toward the retracted position thereof, latch mechanism movable between a latched condition coupled to said heating element for movement therewith and an unlatched condition decoupled from said heating element, a pressure member carried by said frame and movable between a pressing condition in contact with the strap for urging together the overlapping portions thereof and a releasing condition out of contact with the strap, stop means on said frame limiting movement of said pressure member in a pressing direction when said pressure member is in the pressing condition thereof, actuating means mounted on said frame and coupled to said latch mechanism and to said pressure member and being movable among a home configuration for holding said latch mechanism in a latched condition thereof and a heating configuration and a releasing configuration and a sealing configuration, movement of said actuating means from the home configuration to the heating configuration thereof effecting movement of said heating element from the retracted position to the strap-heating position thereof and effecting a first movement of said pressure member from the releasing condition to the pressing condition thereof firmly to press together said heating element and the overlapping portions of the strap for melting thereof, pressure-regulating means carried by said pressure member for engagement with said actuating means during the movement thereof from the home configuration to the heating configuration thereof, said pressure-regulating means being movable by said actuating means with respect to said pressure member when said pressure member is in the pressing condition thereof for absorbing force applied to said pressure member in excess of a predetermined force for limiting the pressure with which said heating element and the overlapping portions of the strap are pressed together, movement of said actuating means from the heating configuration to the releasing configuration thereof effecting movement of said pressure member back to the releasing condition thereof and effecting movement of said latch mechanism from the latched condition to the unlatched condition thereof thereby to permit return of said heating element to the retracted position thereof under the urging of said bias means, movement of said actuating means from the releasing configuration to the sealing configuration thereof effecting a second movement of said pressure member from the releasing condition to the pressing condition thereof for pressing together the melted overlapping portions of the strap to form a joint therebetween, movement of said actuating means from the sealing configuration back to the home configuration thereof effecting movement of said latch mechanism from the unlatched condition back to the latched condition thereof, a shear blade carried by said pressure means for severing the supply portion of the strap when the joint is formed between the melted overlapped portions of the strap, and a blower mounted on said frame for directing a stream of cooling air over said heating element and said actuating means and said pressure means for cooling thereof and for removal of vapors resulting from the melting of the overlapping portion of the strap, whereby there is provided uniform heating of the overlapped portions of the strap and the formation of a uniform joint therebetween.

\* \* \* \* \*